(12) United States Patent
Hodgkins et al.

(10) Patent No.: US 12,410,062 B2
(45) Date of Patent: Sep. 9, 2025

(54) METHOD TO SYNTHESIZE CRYSTALLINE MATERIALS IN THE PRESENCE OF ODSO WITH IMPROVED ZEOLITE CRYSTALLIZATION RATES AND ENHANCED RELATIVE CRYSTALLINITY

(71) Applicant: Saudi Arabian Oil Company, Dhahran (SA)

(72) Inventors: Robert Peter Hodgkins, Dhahran (SA); Omer Refa Koseoglu, Dhahran (SA); Moussa Zaarour, Thuwal (SA); Javier Ruiz Martinez, Thuwal (SA); Samy Ould-Chikh, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 311 days.

(21) Appl. No.: 18/152,379

(22) Filed: Jan. 10, 2023

(65) Prior Publication Data
US 2024/0239670 A1    Jul. 18, 2024

(51) Int. Cl.
  *C01B 39/40*  (2006.01)
  *C01B 25/26*  (2006.01)
  *C01B 25/45*  (2006.01)
  *C01B 39/54*  (2006.01)

(52) U.S. Cl.
  CPC ............ *C01B 39/40* (2013.01); *C01B 25/265* (2013.01); *C01B 25/45* (2013.01); *C01B 39/54* (2013.01)

(58) Field of Classification Search
  None
  See application file for complete search history.

(56) References Cited

U.S. PATENT DOCUMENTS

| | | |
|---|---|---|
| 3,313,594 A | 4/1967 | Wilson |
| 3,516,786 A | 6/1970 | Maher et al. |
| 3,556,725 A | 1/1971 | Chiola et al. |
| 3,702,886 A | 11/1972 | Argauer et al. |
| 3,886,094 A | 5/1975 | Pilato et al. |
| 4,400,328 A | 8/1983 | Takegami et al. |
| 4,402,867 A | 9/1983 | Rodewald |
| 4,406,823 A | 9/1983 | Laurent et al. |
| 5,051,387 A | 9/1991 | Koetsier et al. |
| 5,763,720 A | 6/1998 | Buchanan et al. |
| 5,951,962 A | 9/1999 | Müller et al. |
| 6,136,289 A | 10/2000 | Szabo et al. |
| 6,337,063 B1 | 1/2002 | Rouleau et al. |
| 6,402,936 B1 | 6/2002 | Benazzi et al. |
| 7,041,753 B2 | 5/2006 | McDaniel et al. |
| 7,923,522 B2 | 4/2011 | Hamada et al. |
| 10,486,146 B2 | 11/2019 | Bae et al. |
| 10,781,168 B2 | 9/2020 | Koseoglu et al. |
| 10,793,782 B2 | 10/2020 | Koseoglu et al. |
| 10,807,947 B2 | 10/2020 | Koseoglu et al. |
| 10,927,318 B2 | 2/2021 | Koseoglu et al. |
| 11,111,212 B2 | 9/2021 | Koseoglu et al. |
| 11,124,713 B2 | 9/2021 | Koseoglu et al. |
| 11,214,493 B2 | 1/2022 | Kunkes et al. |
| 2002/0090337 A1 | 7/2002 | Corma Canos et al. |
| 2012/0202006 A1 | 8/2012 | Rimer |

FOREIGN PATENT DOCUMENTS

| | | |
|---|---|---|
| CN | 102452663 A | 5/2012 |
| CN | 103055933 A | 4/2013 |
| CN | 104649294 A | 5/2015 |
| CN | 106145134 A | 11/2016 |
| CN | 107982540 A | 5/2018 |
| CN | 108892150 A | 11/2018 |
| CN | 113195687 | * 7/2021 |
| CN | 113929111 A | 1/2022 |
| EP | 0108611 A2 | 5/1984 |
| EP | 0999183 B1 | 6/2003 |
| EP | 2392548 A1 | 12/2011 |
| GB | 1191467 | 11/1967 |
| GB | 1218883 A | 1/1971 |
| GB | 2017520 A | 10/1979 |
| JP | H0295435 A | 4/1990 |
| WO | 2018202468 A1 | 11/2018 |

OTHER PUBLICATIONS

Daeyaert et al. "Machine-learning approach to the design of OSDAs for zeolite beta." Proceedings of the National Academy of Sciences 116.9 (2019): 3413-3418.
Gizetdinova et al. "Effect of the Alumosilicate Gels pH on Zeolite Phase Composition for the Co-crystallization of BEA/MOR Zeolites in Na2O-? Br—Al2O3—SiO2—H2O System." Journal of Chemistry and Chemical Engineering 8.5 (2014) 453-460.
Grabicka et al. "Microwave-assisted synthesis of periodic mesoporous organosilicas with ethane and disulfide groups." Microporous and mesoporous materials 119.1-3 (2009): 144-149.
Jin et al. "Gold nanoparticles stabilized in a novel periodic mesoporous organosilica of SBA-15 for styrene epoxidation." Microporous and mesoporous materials 111.1-3 (2008): 569-576.
Jo et al. "Synthesis of Silicate Zeolite Analogues Using Organic Sulfonium Compounds as Structure-Directing Agents." Angewandte Chemie International Edition 54.43 (2015). Wiley Online Library, 12996-12999. 14 total pages.
Qi et al. "Studies on the crystallization process of BEA/MOR co-crystalline zeolite." Journal of materials science 43.16 (2008): 5626-5633.
Feng, et al., "Direct Synthesis of ZSM-5 and Mordenite Using Poly(ethylene glycol) as a Structure-Directing Agent", Journal of Porous Materials, Oct. 2003, pp. 235-242.

* cited by examiner

*Primary Examiner* — Sheng H Davis
(74) *Attorney, Agent, or Firm* — Leason Ellis LLP

(57) ABSTRACT

The present disclosure is directed to a method of manufacture of zeolite. A sol-gel formulation includes a water-soluble fraction of ODSO as an additional component. The resulting products include zeolite with increased crystallinity relative to comparable sol-gel formulations without ODSO as a precursor. In additional embodiments, the rate of crystallization of the zeolite is greater relative to comparable sol-gel formulations without ODSO.

20 Claims, 5 Drawing Sheets

METHOD TO SYNTHESIZE CRYSTALLINE MATERIALS IN THE PRESENCE OF ODSO WITH IMPROVED ZEOLITE CRYSTALLIZATION RATES AND ENHANCED RELATIVE CRYSTALLINITY

FIELD OF THE DISCLOSURE

The present disclosure relates to methods to synthesize crystalline materials and increasing the crystallinity and rate of crystallization in zeolites.

BACKGROUND OF THE DISCLOSURE

Zeolites and related crystalline solids (also known as "zeotypes") are microporous crystalline solids possessing well-defined structures and uniform pore sizes that can be measured in angstroms (Å). Typically, zeolites comprise framework atoms such as silicon, aluminum and oxygen arranged as silica and alumina tetrahedra. Other related crystalline solids include crystalline microporous aluminophosphates, silicon-substituted aluminophosphates or metal aluminophosphates. Zeolites are generally hydrated silicates or aluminum silicates that can be made or selected with a controlled porosity and other characteristics, and typically contain cations, water and/or other molecules located in the porous network. Hundreds of natural and synthetic zeolite framework types exist with a wide range of applications. Numerous zeolites occur naturally and are extensively mined, whereas a wealth of interdependent research has resulted in an abundance of synthetic zeolites of different structures and compositions. The unique properties of zeolites and the ability to tailor zeolites for specific applications has resulted in the extensive use of zeolites in industry as catalysts, molecular sieves, adsorbents, ion exchange materials and for the separation of gases. Certain types of zeolites find application in various processes in petroleum refineries and many other applications. The zeolite pores can form sites for catalytic reactions and can also form channels that are selective for the passage of certain compounds and/or isomers to the exclusion of others.

Aluminosilicate zeolites are typically synthesized via hydrothermal means from which zeolite crystals precipitate from a gel, using water as a solvent. The aluminosilicate zeolite comprises repeating tetrahedral unit cells as its framework comprising silicon, aluminum and oxygen. When trivalent Al substitutes for tetrahedral silica in the framework a negative charge is induced that is counter-balanced by a cation, typically an alkali metal such as $Na^+$. In order for the zeolite to exhibit acidity the sodium cation should be replaced with a proton. The proton associated with counter-balancing the negative charge derived from the framework aluminum results in a Brønsted acid site. Lewis acidity typically results from extra-framework aluminum.

Within a typical refinery, there are by-product streams that must be treated or otherwise disposed of. The mercaptan oxidation process, commonly referred to as the MEROX process, has long been employed for the removal of the generally foul smelling mercaptans found in many hydrocarbon streams and was introduced in the refining industry over fifty years ago. Because of regulatory requirements for the reduction of the sulfur content of fuels for environmental reasons, refineries have been, and continue to be faced with the disposal of large volumes of sulfur-containing by-products. Disulfide oil (DSO) compounds are produced as a by-product of the MEROX process, in which the mercaptans are removed from any of a variety of petroleum streams including liquefied petroleum gas, naphtha, and other hydrocarbon fractions. It is commonly referred to as a 'sweetening process' because it removes the sour or foul smelling mercaptans present in crude petroleum. The term "DSO" is used for convenience in this description and in the claims, and will be understood to include the mixture of disulfide oils produced as by-products of the mercaptan oxidation process. Examples of DSO include dimethyldisulfide, diethyldisulfide, and methylethyldisulfide.

The by-product DSO compounds produced by the MEROX unit can be processed and/or disposed of during the operation of various other refinery units. For example, DSO can be added to the fuel oil pool at the expense of a resulting higher sulfur content of the pool. DSO can be processed in a hydrotreating/hydrocracking unit at the expense of higher hydrogen consumption. DSO also has an unpleasant foul or sour smell, which is somewhat less prevalent because of its relatively lower vapor pressure at ambient temperature; however, problems exist in the handling of this oil.

Commonly owned U.S. Pat. No. 10,807,947 which is incorporated by reference herein in its entirety discloses a controlled catalytic oxidation of MEROX process by-products DSO. The resulting oxidized material is referred to as oxidized disulfide oil (ODSO). As disclosed in 10,807,947, the by-product DSO compounds from the mercaptan oxidation process can be oxidized, preferably in the presence of a catalyst. The oxidation reaction products constitute an abundant source of ODSO compounds, sulfoxides, sulfonates, sulfinates and sulfones.

The ODSO stream so-produced contains ODSO compounds as disclosed in U.S. Pat. Nos. 10,781,168 and 11,111,212 as compositions (such as a solvent), in U.S. Pat. No. 10,793,782 as an aromatics extraction solvent, and in U.S. Pat. No. 10,927,318 as a lubricity additive, all of which are incorporated by reference herein in their entireties. In the event that a refiner has produced or has on hand an amount of DSO compounds that is in excess of foreseeable needs for these or other uses, the refiner may wish to dispose of the DSO compounds in order to clear a storage vessel and/or eliminate the product from inventory for tax reasons.

Thus, there is a clear and long-standing need to provide an efficient and economical process for the treatment of the large volumes of DSO by-products and their derivatives to effect and modify their properties in order to facilitate and simplify their environmentally acceptable disposal, and to utilize the modified products in an economically and environmentally friendly manner, and thereby enhance the value of this class of by-products to the refiner.

Despite the known ways to produce zeolites, there remains a need in the art for improved methods to produce zeolite materials, in particular using DSO by-products in an economically and environmentally friendly manner. It is in regard to these and other problems in the art that the present disclosure is directed to provide a technical solution for an effective method of increasing the crystallinity and rate of crystallization in zeolites.

SUMMARY OF THE DISCLOSURE

In certain embodiments, a method for synthesis of crystalline material is provided. The method comprises forming a sol-gel composition of precursors and reagents effective for the crystalline material, water and water-soluble oxidized disulfide oil (ODSO). The sol-gel composition is heated under conditions and for a time effective to form a precipitate suspended in a supernatant. The precipitate comprises a crystalline material. In some embodiments, the crystalline material is characterized by a relative crystallinity that is greater than that of a comparative material. In some embodiments, crystalline material is formed at a crystallization rate that is greater than that of a comparative material. The comparative material is formed of approximately equivalent composition of components except for water instead of the added ODSO, and under approximately equivalent conditions and time.

In some embodiments, the relative crystallinity of the crystalline material is in the range of from 1-85, 40-85, 60-85, 1-60, 40-60, or 50% greater than that of an equivalent water-only crystalline material synthesis. In some embodiments, the crystalline material is formed at a crystallization rate that is in the range of from 1-90, 40-90, 60-90, 1-75, 40-75, or 60% greater than that of an equivalent water-only crystalline material synthesis.

In some embodiments, the crystalline material is zeolite and precursors and reagents effective for the crystalline material comprise a silica source, an optional alumina source, a mineralizer, an optional structure directing agent an optional seed material. In some embodiments, the zeolite possesses MFI, FAU, *BEA, MOR, or CHA frameworks. In some embodiments, the mineralizer comprises is sodium and the zeolite is a ZSM-5 zeolite and the mass ratio of ODSO to sodium from the mineralizer is in the range of about 0.1-10. In some embodiments, the mineralizer comprises is sodium and the zeolite is a CHA zeolite and the mass ratio of ODSO to sodium from the mineralizer is in the range of about 0.1-11. In some embodiments, the mineralizer comprises is sodium and the zeolite is a FAU zeolite and the mass ratio of ODSO to sodium from the mineralizer is in the range of about 0.1-2.5. In some embodiments, the zeolite is a ZSM-5 zeolite and the amount by mass of water in the sol-gel composition can be substituted with ODSO in an amount of up to about 15%, or up to about 13.2%. In some embodiments, the zeolite is a FAU zeolite and the amount by mass of water in the sol-gel composition can be substituted with ODSO in an amount of up to about 9.4%. In some embodiments, the zeolite is a CHA zeolite and the amount by mass of water in the sol-gel composition can be substituted with ODSO in an amount of up to about 3.9%. In some embodiments, wherein the structure directing agent is one or more of quaternary ammonium ions, trialkylamines, dialkylamines, monoalkylamines, cyclic amines, alkylethanol amines, cyclic diamines, alkyl diamines, alkyl polyamines, and other templates including alcohols, ketones, morpholine and glycerol.

In some embodiments, the crystalline material is an AlPO and the precursors and reagents effective for the crystalline material comprise an alumina source, a phosphorus source, an acid medium, an optional structure directing agent and an optional seed material. In some embodiments, the structure directing agent is one or more of secondary and tertiary amine derived templates, quaternary ammonium derived templates, azamacrocycle derived templates, spiro templates, diaazabicyclo derived templates, or phosphazine based templates.

In some embodiments, the crystalline material is a SAPO and the precursors and reagents effective for the crystalline material comprise an alumina source, a silica source, a phosphorus source, an acid medium, an optional structure directing agent and an optional seed material, which are formed as a homogeneous aqueous solution. In some embodiments, the structure directing agent is one or more of secondary and tertiary amine derived templates, quaternary ammonium derived templates, azamacrocycle derived templates, spiro templates, diaazabicyclo derived templates, or phosphazine based templates.

In some embodiments, the crystalline material is a MAPO and the precursors and reagents effective for the crystalline material comprise an alumina source, a metal source, a phosphorus source, an acid medium, an optional structure directing agent and an optional seed material, which are formed as a homogeneous aqueous solution. In some embodiments, the structure directing agent is one or more of secondary and tertiary amine derived templates, quaternary ammonium derived templates, azamacrocycle derived templates, spiro templates, diaazabicyclo derived templates, or phosphazine based templates. In some embodiments, the metal source is one or more of Ti, V, Cr, Mn, Fe, Co, Ni, Cu, Zn, Cd or Mg.

In some embodiments, the precipitate further comprises amorphous material. In some embodiments, the amount of crystalline material (C) relative to the amount of amorphous material (A) in the precipitate is calculated by the following equations:

$$R_p = 100 \times \frac{S_p(ZMV)_p}{\sum_i S_i(ZMV)_i},$$

$$\text{Corr}(R_p) = R_p \times \frac{W_{Std}}{R_{Std}},$$

$$A = 100 - W_{Std} - \sum \text{Corr}(R_p),$$

and $$C = 100 - A,$$

wherein:
$R_p$=relative proportion of a particular phase,
S=the Rietveld scale factor, which is a parameter that is sample and phase dependent,
Z=the number of formula units per unit cell,
M=the mass of the formula unit,
V=the unit-cell volume,
i=number of phases in sample,
p=a particular phase,
Corr($R_p$)=corrected relative proportion of a particular phase,
$W_{Std}$(%)=the weighed concentration of an internal standard, and
$R_{Std}$(%)=the Rietveld analyzed concentration of the internal standard.

In some embodiments, the sol-gel composition can be from a colloidal suspension in appearance to a dense gel or paste. In some embodiments, the operating pressure is in the range of from atmospheric pressure to 17 bar. In some embodiments, the operating pressure is autogenous pressure. In some embodiments, a nitrogen blanket or purge air is introduced prior to heating.

In certain embodiments, the ODSO is derived from oxidation of disulfide oil compounds present in an effluent refinery hydrocarbon stream recovered following catalytic oxidation of mercaptans present in a mercaptan-containing hydrocarbon stream. In certain embodiments, the one or more ODSO compounds comprise ODSO compounds having 3 or more oxygen atoms. In certain embodiments, one or more ODSO compounds comprise ODSO compounds having 1 to 20 carbon atoms. In certain embodiments, the one or more ODSO compounds are in a mixture having an average density greater than about 1.0 g/cc. In certain embodiments, the one or more ODSO compounds are in a mixture having an average boiling point greater than about 80° C. In certain embodiments, the ODSO compounds have 3 or more oxygen atoms and include one or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), wherein R and R' are C1-C10 alkyl or C6-C10 aryl groups. In certain embodiments, the ODSO compounds have 3 or more oxygen atoms and include two or more compounds selected from the group consisting of (R—SOO—SO—R'), (R—SOO—SOO—R'), (R—SO—SOO—OH), (R—SOO—SOO—OH), (R—SOO—SO—OH) (R'—SO—SO—OR), (R'—SOO—SO—OR), (R'—SO—SOO—OR) and (R'—SOO—SOO—OR), wherein R and R' are C1-C10 alkyl or C6-C10 aryl groups. In certain embodiments, the ODSO compounds have 3 or more oxygen atoms and include one or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), wherein R and R' are C1-C10 alkyl or C6-C10 aryl groups. In certain embodiments, the ODSO compounds have 3 or more oxygen atoms and include two or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), wherein R and R' are C1-C10 alkyl or C6-C10 aryl groups.

Any combinations of the various embodiments and implementations disclosed herein can be used. These and other aspects and features can be appreciated from the following description of certain embodiments and the accompanying drawings and claims.

DETAILED DESCRIPTION OF CERTAIN EMBODIMENTS OF THE DISCLOSURE

Figures 1, 2:
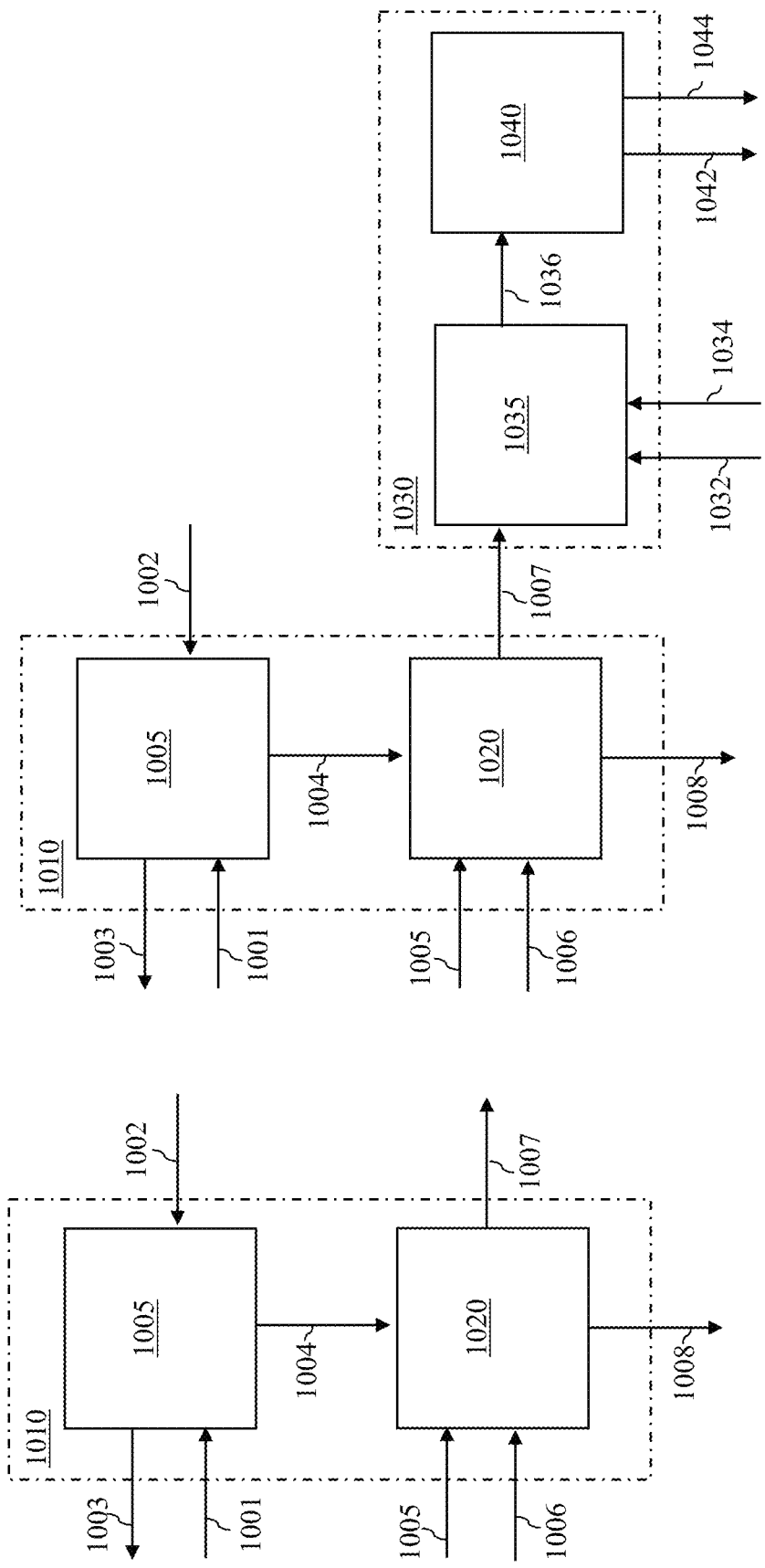
FIG. 1 is a simplified schematic diagram of a generalized version of a conventional mercaptan oxidation or MEROX process for the liquid-liquid extraction of a mercaptan containing hydrocarbon stream.
FIG. 2 is a simplified schematic diagram of a generalized version of an enhanced mercaptan oxidation or E-MEROX process.

The present disclosure is directed to a method of manufacture of crystalline material. A sol-gel formulation includes a water-soluble fraction of ODSO as an additional component. In some embodiments, the rate of crystallization is greater relative to comparable sol-gel formulations without ODSO.

In some embodiments a sol-gel composition that includes precursors and reagents effective for the crystalline material, water and water-soluble oxidized disulfide oil (ODSO) is formed. The sol-gel composition mixture is heated under conditions and for a time effective to form precipitate suspended in a supernatant, wherein the precipitate comprises a crystalline material. The crystalline material can be formed at a crystallization rate that is greater than that of a comparative material, and wherein the comparative material is formed of approximately equivalent composition of components except for water instead of the added ODSO, and under approximately equivalent conditions and time.

In some embodiments, the crystalline material is formed at a crystallization rate that is in the range of from 1-90, 40-90, 60-90, 1-75, 40-75, or 60% greater than that of an equivalent water-only crystalline material synthesis.

In some embodiments, the resulting products include crystalline material with increased crystallinity relative to comparable sol-gel formulations without ODSO. In certain embodiments, the crystallinity can be tailored by adjusting the amount of ODSO component in the sol-gel formulation.

In some embodiments, a sol-gel composition that includes precursors and reagents effective for the crystalline material, water, and water-soluble oxidized disulfide oil (ODSO) is formed. The sol-gel composition is heated under conditions and for a time effective to form a precipitate suspended in a supernatant, wherein the precipitate comprises a crystalline material. The crystalline material can be characterized by a relative crystallinity that is greater than that of a comparative material that is formed of approximately equivalent composition of components except for water instead of the added ODSO, and under approximately equivalent conditions and time. In some embodiments, an increase in a sub-ratio of water-soluble ODSO to water effects an increase in the relative crystallinity. In some embodiments, the relative crystallinity of the crystalline material is in the range of from 1-85, 40-85, 60-85, 1-60, 40-60, or 50% greater than that of an equivalent water-only crystalline material synthesis.

In certain embodiments the method is carried out using a solution of precursors and reagents in effective ratios, under effective conditions and for an effective time, to synthesize zeolites, wherein the solution further comprises an effective amount of ODSO.

In certain embodiments the method is carried out using a solution of precursors and reagents in effective ratios, under effective conditions and for an effective time, to synthesize crystalline microporous aluminophosphates, wherein the solution further comprises an effective amount of ODSO.

In certain embodiments the method is carried out using a solution of precursors and reagents in effective ratios, under effective conditions and for an effective time, to synthesize silicon-substituted aluminophosphates, wherein the solution further comprises an effective amount of ODSO.

In certain embodiments the method is carried out using a solution of precursors and reagents in metal aluminophosphates, wherein the solution further comprises an effective amount of ODSO.

In certain embodiments the overall crystallinity of the crystalline material is increased using ODSO components as an additional component compared with an equivalent water-only crystalline material synthesis. For example, inclusion of ODSO components in the syntheses herein increases the overall crystalline material crystallinity by at least about 1-85, 40-85, 60-85, 1-60, 40-60, or 50 mass % compared with an equivalent water-only synthesis.

In certain embodiments the overall crystallization rate of the crystalline material is increased using ODSO components as an additional component compared with an equivalent water-only crystalline material synthesis. For example, inclusion of ODSO components in the syntheses herein increases the overall crystallization rate of the crystalline material by at least about 1-90, 40-90, 60-90, 1-75, 40-75, or 60% compared with an equivalent water-only synthesis.

In certain embodiments, the crystallization rate and/or the crystalline material crystallinity is increased, and zeolite having the same general crystalline material framework as the equivalent water-only synthesis is produced. In certain embodiments, the crystallization rate and/or the crystalline material crystallinity is increased, and crystalline material having the same general crystalline material framework as the equivalent water-only synthesis is produced along with one or more other types of zeolites, amorphous silica, amorphous alumina and/or amorphous silica-alumina. In certain embodiments, the crystallization rate and/or the crystalline material crystallinity is increased, and crystalline material having a different general crystalline material framework as the equivalent water-only synthesis is produced.

In conventional synthesis of materials, water is used as an aqueous medium and as a solvent. In the embodiments of the present disclosure, an effective amount of water-soluble ODSO compounds is added within a homogeneous aqueous mixture. Methods for the preparation of materials of various types are known and discussed herein for reference, but it is understood that variations of that which is disclosed herein can benefit from the use of a water-soluble ODSO component. In certain embodiments, the ODSO is derived from a sulfur-containing refinery waste stream of disulfide oil and is used as a component for the synthesis of zeolites having increased crystallinity and/or crystallization rate as compared to an equivalent synthesis in the absence of ODSO.

In the embodiments herein, the type of material, and sub-type of material within a given material type, can be controlled by one or more factors including but not limited to the precursor and reagent selections and ratios (for example, silica to alumina ratio), pH of the sol-gel, aging time (if any), crystallization temperature and crystallization time. In certain embodiments herein, the addition of the water soluble ODSO component in the synthesis process results in a different sub-type or even type of material as compared to an equivalent process in the absence of the added water soluble ODSO component. In certain embodiments herein, the compositional ratios of the precursors and reagents can be similar to those used in synthesis of similar products in the absence of the water soluble ODSO component herein.

In embodiments herein, the synthesis of crystalline materials includes in its sol-gel a water-soluble ODSO component. The water-soluble ODSO component can be in the form of a neat water-soluble ODSO, as an aqueous water-soluble ODSO solution, a mixture with an alkaline source as a pH modified water-soluble ODSO composition, and/or a supernatant from a prior synthesis using water-soluble ODSO or neutralized ODSO. In embodiments herein, synthesis of crystalline materials includes an aqueous water-soluble ODSO composition that contributes a portion of requisite utility water for the sol-gel, wherein the water-soluble ODSO composition is used in place of a certain amount of water. In embodiments herein, synthesis of crystalline materials includes a water-soluble ODSO composition that contributes all or a portion of requisite mineralizer for the sol-gel, for example, using a pH-modified water-soluble ODSO composition comprising an aqueous mixture of one or more water-soluble ODSO compounds and an effective amount of an alkaline agent as disclosed in co-pending and commonly owned U.S. patent application Ser. No. 17/850,158 filed on Jun. 27, 2022, entitled "pH-Modified Water-Soluble Oxidized Disulfide Oil Compositions" and Ser. No. 17/850,115 filed on Jun. 27, 2022, entitled "Method of Zeolite Synthesis Including pH-Modified Water-Soluble Oxidized Disulfide Oil Compositions" which are incorporated by reference herein in their entireties. In certain embodiments the water-soluble ODSO component is provided as a pH-modified water-soluble ODSO composition, and is used in place of all or a portion of requisite mineralizer for zeolite synthesis, and in place of a certain amount of water (including all or a portion of utility water). In embodiments herein, synthesis of crystalline materials includes supernatant from a prior synthesis that utilized water-soluble ODSO or neutralized ODSO as a component in place of a certain amount of utility water, for example as disclosed in co-pending and commonly owned U.S. patent application Ser. No. 17/850,285 filed on Jun. 27, 2022, entitled "Method of Synthesizing Materials Integrating Supernatant Recycle" which is incorporated by reference herein in its entirety.

An effective amount of water for the aqueous environment and as a solvent during the sol-gel process can be provided from one or more water sources, including utility water that is added to form the homogeneous aqueous mixture, a water-containing silica source such as colloidal silica, an aqueous mixture of an alumina source, an aqueous mixture of an alkali metal source, and/or an aqueous mixture of an optional structure directing agent. These mixture components are added with water to the reaction vessel prior to heating. Typically, water allows for adequate mixing to realize a more homogeneous distribution of the sol-gel components, which ultimately produces a more desirable product because each crystal is more closely matched in properties to the next crystal. Insufficient mixing could result in undesirable "pockets" of highly concentrated sol-gel components, and this may lead to impurities in the form of different structural phases or morphologies. Water also determines the yield per volume. In the descriptions that follow, it is understood that water is a component of homogeneous aqueous mixtures from one or more of the sources of water.

In embodiments herein, a portion of the effective amount of water required for sol-gel synthesis is replaced with a water soluble ODSO. The water that is replaced with water soluble ODSO can be all or a portion of the utility water that would typically be added.

In some embodiments, the crystalline material is zeolite and precursors and reagents effective for the crystalline material comprise a silica source, an aluminum source, a mineralizer, such as an alkali metal source, an optional structure directing agent and an optional seed material. Without wishing to be bound by theory, a generalized idea for the mechanism of zeolite crystallization is that nucleation of individual particles precedes zeolite crystal growth. The nucleation phase results in discrete entities of the new phase to which nutrients attach allowing for zeolite growth that follows a classic S-shape crystallization curve.

The present disclosure is applicable to various types of zeolites that are synthesized hydrothermally, which can benefit from inclusion of ODSO components as described herein in the synthesis. Suitable zeolitic materials include those identified by the International Zeolite Association, including those with the identifiers ABW, ACO, AEI, AEL, AEN, AET, AFG, AFI, AFN, AFO, AFR, AFS, AFT, AFV, AFX, AFY, AHT, ANA, ANO, APC, APD, AST, ASV, ATN, ATO, ATS, ATT, ATV, AVE, AVL, AWO, AWW, BCT, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETL, ETR, ETV, EUO, EWO, EWS, EZT, FAR, FAU, FER, FRA, GIS, GIU, GME, GON, GOO, HEU, IFO, IFR, -IFT, -IFU, IFW, IFY, IHW, IMF, IRN, IRR, -IRY, ISV, ITE, ITG, ITH, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, MRT, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POR, POS, PSI, PTO, PTT, PTY, PUN, PWN, PWO, PWW, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, SFW, SGT, SIV, SOD, SOF, SOR, SOS, SOV, SSF, SSY, STF, STI, STT, STW, -SVR, SVV, SWY, -SYT, SZR, TER, THO, TOL, TON, TSC, TUN, UEI, UFI, UOS, UOV, UOZ, USI, UTL, UWY, VET, VFI, VNI, VSV, WEI, -WEN, YFI, YUG, ZON, *BEA, *CTH, *-EWT, *-ITN, *MRE, *PCS, *SFV, *-SSO, *STO, *-SVY, *UOE. In certain embodiments, zeolites synthesized herein comprise co-crystallized products of two or more types of zeolites identified above. In certain embodiments, zeolites synthesized herein comprise purely siliceous crystalline materials with a SAR close to infinity, such as silicalites (e.g., Silicalite-1). Note that the three-letter codes designated herein correspond to the framework types established by the International Zeolite Association.

For example, certain non-limiting examples of zeolites known to be useful in the petroleum refining industry include but are not limited to those possessing MFI, FAU, *BEA, MOR, or CHA frameworks. In certain embodiments a zeolite synthesized can be MFI framework, which includes ZSM-5, having a micropore size related to the 10-member rings when viewed along the [100] and [010] directions of 5.5×5.1 Å and 5.6×5.3 Å, respectively. In certain embodiments a zeolite synthesized can be FAU framework, which includes USY, having a micropore size related to the 12-member ring when viewed along the [111] direction of 7.4×7.4 Å. In certain embodiments a zeolite synthesized can be *BEA framework, which includes zeolite beta polymorph A, having a micropore size related to the 12-member rings when viewed along the [100] and [001] directions of 6.6×6.7 Å and 5.6×5.6 Å, respectively. In certain embodiments a zeolite synthesized can be MOR framework, which includes mordenite zeolites, having a micropore size related to the 12-member ring and 8-member ring when viewed along the [001] and [001] directions of 6.5×7.0 Å and 2.6×5.7 Å, respectively. In certain embodiments a zeolite synthesized can be CHA framework zeolite, which includes chabazite zeolite, having a micropore size related to the 8-member ring when viewed normal to the [001] direction of 3.8×3.8 Å.

In an embodiment of a method of synthesizing zeolite, effective amounts and proportions of precursors and reagents are formed together with water-soluble ODSO as a homogeneous aqueous mixture, including a water source, an optional alumina source, a silica source, a mineralizer, an optional structure directing agent and an optional seed material. An effective amount of a water-soluble ODSO component is used as an additional component in the syntheses processes herein. The water-soluble ODSO component can be in the form of a neat water-soluble ODSO, as an aqueous water-soluble ODSO solution, a mixture with an alkaline source as a pH modified water-soluble ODSO composition, for instance to provide a neutralized ODSO composition (as disclosed in U.S. patent application Ser. Nos. 17/850,158 and 17/850,115, both filed on Jun. 27, 2022 and incorporated by reference hereinabove), and/or a supernatant from a prior synthesis using water-soluble ODSO or neutralized ODSO (as disclosed in U.S. patent application Ser. No. 17/850,285 filed on Jun. 27, 2022 and incorporated by reference hereinabove).

An effective amount of water-soluble ODSO is used as an additional component in zeolite synthesis. In certain embodiments the water-soluble ODSO composition is used in place of a certain amount of water. In certain embodiments the water-soluble ODSO is provided as a pH-modified water-soluble ODSO composition and is used in place of an equivalent amount (on a volume or mass basis) of a certain amount of utility water for the homogeneous aqueous mixture. In certain embodiments the water-soluble ODSO is provided as a pH-modified water-soluble ODSO composition and is used in place of all or a portion of requisite mineralizer for zeolite synthesis. In certain embodiments the water-soluble ODSO is used in place of all or a portion of requisite mineralizer for zeolite synthesis, and in place of a certain amount of water (including all or a portion of utility water).

The components are mixed for an effective time and under conditions suitable to form the homogeneous aqueous mixture. The chronological sequence of mixing can vary, with the objective being a highly homogenous distribution of the components in an aqueous mixture. In certain embodiments, the homogeneous aqueous mixture is formed by: providing a silica source; combining an optional alumina source, an optional mineralizer and an optional structure directing agent; and combining water soluble ODSO. Alternatively, the water soluble ODSO is combined with the optional alumina source, the optional mineralizer and the optional structure directing agent, and that mixture is combined with the silica source. In certain embodiments, the homogeneous aqueous mixture is formed by: providing an optional alumina source, an optional mineralizer and an optional structure directing agent as a mixture; combining a silica source; and combining a water soluble ODSO. Alternatively, the water soluble ODSO is combined with the silica source, and that mixture is combined with the optional alumina source, the optional mineralizer and the optional structure directing agent. In certain embodiments, the homogeneous aqueous mixture is formed by: combining a water soluble ODSO with a silica source to form a mixture; and that mixture is combined with an optional alumina source, an optional mineralizer and an optional structure directing agent. In certain embodiments, the homogeneous aqueous mixture is formed by: combining a water soluble ODSO with an optional alumina source, an optional mineralizer and an optional structure directing agent to form a mixture; and that mixture is combined with a silica source.

A homogeneous aqueous mixture of the precursors and reagents, including water soluble ODSO, is formed from any of the above chronological sequences of component addition. The components are mixed for an effective time and under conditions suitable to form the homogeneous aqueous mixture. The homogeneous aqueous mixture is heated under conditions and for a time effective to form a precipitate (product) suspended in a supernatant (mother liquor). The precipitate is recovered, for example by filtration, washing and drying. In certain embodiments the recovered precipitate is calcined at a suitable temperature, temperature ramp rate and for a suitable period of time.

The eventual framework of the as-made zeolites depends on various factors including but not limited to the time and/or temperature of hydrothermal reaction; selected structure directing agents (if any); selected seeds; and/or selected mineralizer. In certain embodiments, inclusion of a water-soluble ODSO shifts a phase boundary of a sol-gel composition to a certain zeolite framework type having an equivalent amount of water being replaced, even using compositional ratios and conditions (other than the water-soluble ODSO) typically effective for synthesis of a different type of crystalline material, a different sub-type of zeolite, or that would typically produce amorphous material.

In certain embodiments, the zeolite is a ZSM-5 zeolite and the amount by mass of water in the sol-gel composition can be substituted with ODSO in an amount of up to about 15%, or up to about 13.2%. In certain embodiments, the zeolite is a FAU zeolite and the amount by mass of water in the sol-gel composition can be substituted with ODSO in an amount of up to about 9.4%. In certain embodiments, the zeolite is a CHA zeolite and the amount by mass of water in the sol-gel composition can be substituted with ODSO in an amount of up to about 3.9%.

In some embodiments, the crystalline material is crystalline microporous aluminophosphates (AlPOs) and precursors and reagents effective for the crystalline material comprise an alumina source, a phosphorus source, an acid medium, an optional structure directing agent and an optional seed material. The present disclosure is applicable to various types of AlPOs that are synthesized hydrothermally, which can benefit from inclusion of ODSO components as described herein in the synthesis. Suitable AlPO materials include but are not limited to AlPO sub-types: (AEI) including AlPO-18, (AEL) including AlPO-11, (AEN) including AlPO-53, (AET) including AlPO-8, (AFI) including AlPO-5, (AFN) including AlPO-14, (AFO) including AlPO-41, (AFR) including AlPO-40; (AFT) including AlPO-52; (ANA) including AlPO-24; (AST) including AlPO-16; (ATO) including AlPO-31; (ATS) including AlPO-36; (ATT) including AlPO-33; (ATV) including AlPO-25; (AWO) including AlPO-21; (AWW) including AlPO-22; (CHA) including AlPO-34; (ERI) including AlPO-17; (LEV) including AlPO-35; (SOD) including AlPO-20; or (VFI) including AlPO-54.

In an embodiment of a method of synthesizing one or more AlPOs, effective amounts and proportions of precursors and reagents are formed together with water-soluble ODSO as a homogeneous aqueous mixture, including a water source, an alumina source, a phosphorus source, an acid medium, an optional structure directing agent and an optional seed material. It is understood that the phosphorus source and the acid medium can be the same, for instance, phosphoric acid. An effective amount of a water-soluble ODSO component is used as an additional component in the synthesis herein. The water-soluble ODSO component can be in the form of a neat water-soluble ODSO; an aqueous water-soluble ODSO solution; and/or a supernatant from a prior synthesis using water-soluble ODSO or neutralized ODSO (as disclosed in U.S. patent application Ser. No. 17/850,285 filed on Jun. 27, 2022 and incorporated by reference hereinabove).

The components are mixed for an effective time and under conditions suitable to form the homogeneous aqueous mixture. The homogeneous aqueous mixture is heated under conditions and for a time effective to form a precipitate (product) suspended in a supernatant (mother liquor). The precipitate is recovered, for example by filtration, washing and drying, and according to the methods herein, the relative amount of water-soluble ODSO in the initial homogeneous aqueous mixture is effective to synthesize AlPO. The eventual framework of the as-made crystalline component depends on various factors including but not limited to the time and/or temperature of hydrothermal reaction; selected structure directing agents (if any); and/or selected seeds. In certain embodiments, inclusion of a water-soluble ODSO shifts a phase boundary of a sol-gel composition to a certain AlPO framework type having an equivalent amount of water being replaced, even using compositional ratios and conditions (other than the water-soluble ODSO) typically effective for synthesis of a different type or sub-type of crystalline material, or that would typically produce amorphous material.

In some embodiments, the crystalline material is silicon-substituted aluminophosphates, silicoaluminophosphate (SAPOs) and precursors and reagents effective for the crystalline material comprise an alumina source, a silica source, a phosphorus source, an acid medium, an optional structure directing agent and an optional seed material. The present disclosure is applicable to various types of SAPOs that are synthesized hydrothermally, which can benefit from inclusion of ODSO components as described herein in the synthesis. Suitable SAPO materials include but are not limited to SAPO sub-types: (AEI) including SAPO-18, (AEL) including SAPO-11, (AFI) including SAPO-5, (AFO) including SAPO-41, (AFR) including SAPO-40, (AFX) including SAPO-56, (ATN) including SAPO-39, (ATO) including SAPO-31, (CHA) including SAPO-34 and -47, (FAU) including SAPO-37, (GIS) including SAPO-43, (LEV) including SAPO-35, or (LTA) including SAPO-42.

In an embodiment of a method of synthesizing one or more SAPOs, effective amounts and proportions of precursors and reagents are formed together with water-soluble ODSO as a homogeneous aqueous mixture, including a water source, an alumina source, a silica source, a phosphorus source, an acid medium, an optional structure directing agent and an optional seed material. It is understood that the phosphorus source and the acid medium can be the same, for instance, phosphoric acid. An effective amount of a water-soluble ODSO component is used as an additional component in the syntheses processes herein. The water-soluble ODSO component can be in the form of a neat water-soluble ODSO; an aqueous water-soluble ODSO solution; and/or a supernatant from a prior synthesis using water-soluble ODSO or neutralized ODSO (as disclosed in U.S. patent application Ser. No. 17/850,285 filed on Jun. 27, 2022 and incorporated by reference hereinabove).

The components are mixed for an effective time and under conditions suitable to form the homogeneous aqueous mixture. The homogeneous aqueous mixture is heated under conditions and for a time effective to form a precipitate (product) suspended in a supernatant (mother liquor). The precipitate is recovered, for example by filtration, washing and drying, and according to the methods herein, the relative amount of water-soluble ODSO in the initial homogeneous aqueous mixture is effective to synthesize SAPO. The eventual framework of the as-made crystalline component depends on various factors including but not limited to the time and/or temperature of hydrothermal reaction; selected structure directing agents (if any); and/or selected seeds. In certain embodiments, inclusion of a water-soluble ODSO shifts a phase boundary of a sol-gel composition to a certain SAPO framework type having an equivalent amount of water being replaced, even using compositional ratios and conditions (other than the water-soluble ODSO) typically effective for synthesis of a different type or sub-type of crystalline material, or that would typically produce amorphous material.

In some embodiments, the crystalline material is metal aluminophosphates (MAPOs) and precursors and reagents effective for the crystalline material comprise an alumina source, a metal source, a phosphorus source, an acid medium, an optional structure directing agent and an optional seed material. The present disclosure is applicable to various types of MAPOs that are synthesized hydrothermally, which can benefit from inclusion of ODSO components as described herein in the synthesis. Suitable MAPOs materials include but are not limited to MAPO sub-types: (AFI) including MAPO-5; (AFS) including MAPO-46; (ATN) including MAPO-39; (ATO) including MAPO-31; (ATS) including MAPO-36; or (GIS) including MAPO-43.

In certain embodiments, selection and ratios of precursors and reagents effective for synthesis of MAPO materials, effective amounts and proportions of precursors and reagents are formed together with water-soluble ODSO as a homogeneous aqueous mixture, including a water source, an alumina source, a metal source, a phosphorus source, an acid medium, an optional structure directing agent and an optional seed material. It is understood that the phosphorus source and the acid medium can be the same, for instance, phosphoric acid. The metal source can be one or more of Ti, V, Cr, Mn, Fe, Co, Ni, Cu, Zn, Cd or Mg. An effective amount of a water-soluble ODSO component is used as an additional component in the syntheses processes herein. The water-soluble ODSO component can be in the form of a neat water-soluble ODSO; an aqueous water-soluble ODSO solution; and/or a supernatant from a prior synthesis using water-soluble ODSO or neutralized ODSO (as disclosed in U.S. patent application Ser. No. 17/850,285 filed on Jun. 27, 2022 and incorporated by reference hereinabove).

The components are mixed for an effective time and under conditions suitable to form the homogeneous aqueous mixture. The homogeneous aqueous mixture is heated under conditions and for a time effective to form a precipitate (product) suspended in a supernatant (mother liquor). The precipitate is recovered, for example by filtration, washing and drying, and according to the methods herein, the relative amount of water-soluble ODSO in the initial homogeneous aqueous mixture is effective to synthesize MAPO. The eventual framework of the as-made crystalline component depends on various factors including but not limited to the time and/or temperature of hydrothermal reaction; selected structure directing agents (if any); and/or selected seeds. In certain embodiments, inclusion of a water-soluble ODSO shifts a phase boundary of a sol-gel composition to a certain MAPO framework type having an equivalent amount of water being replaced, even using compositional ratios and conditions (other than the water-soluble ODSO) typically effective for synthesis of a different type or sub-type of crystalline material, or that would typically produce amorphous material.

In the above embodiments in which a silica source is used, the silica source can comprise, without limitation, one or more of silicates including sodium silicate (water glass), rice husk, fumed silica, precipitated silica, colloidal silica, silica gels, other zeolites, dealuminated zeolites, and silicon hydroxides and alkoxides. Silica sources resulting in a high relative yield are preferred. For instance, suitable materials as silica sources include fumed silica commercially available from Cabotand colloidal silica (LUDOX commercially available from Cabot).

In the above embodiments in which an alumina source is used, the aluminum source can comprise, without limitation, one or more of aluminates, alumina, other zeolites, aluminum colloids, boehmites, pseudo-boehmites, aluminum salts such as aluminum nitrate, aluminum sulfate and alumina chloride, aluminum hydroxides and alkoxides, aluminum wire and alumina gels. For example, suitable materials as aluminum sources include commercially available materials including for instance high purity aluminas (CERALOX commercially available from Sasol) and alumina hydrates (PURAL and CAPITAL commercially available from Sasol), boehmites (DISPERSAL and DISPAL commercially available from Sasol), and silica-alumina hydrates (SIRAL commercially available from Sasol) and the corresponding oxides (SIRALOX commercially available from Sasol).

In the above embodiments in which a phosphorus source is used, the phosphorus source can comprise, without limitation, one or more of phosphoric acid, phosphoric acid salt, pyrophosphoric acid or phosphorous acid.

In the above embodiments in which a structure directing agent is used, the structure directing agent selected to influence the target type of crystalline material structure to be formed. Effective structure directing agents that can optionally be added include known or developed structure directing agents for a particular type or sub-type of crystalline material. Effective structure directing agents for zeolites include one or more of quaternary ammonium ions, trialkylamines, dialkylamines, monoalkylamines, cyclic amines, alkylethanol amines, cyclic diamines, alkyl diamines, alkyl polyamines, and other templates including alcohols, ketones, morpholine and glycerol. For example, in embodiments in which the target zeolite structures are MFI, including ZSM-5, beta zeolite, or mordenite zeolite, suitable structure directing agents include but are not limited to one or more of quaternary ammonium cation compounds (including one or more of tetramethylammonium (TMA) cation compounds, tetraethylammonium (TEA) cation compounds, tetrapropylammonium (TPA) cation compounds, tetrabutylammonium (TBA) cation compounds, cetyltrimethylammonium (CTA) cation compounds; the cation can be paired with one or more of a hydroxide anion (for example, TPAOH or CTAOH), a bromide anion (for example, TPAB or CTAB), or an iodide anion. In embodiments in which the target zeolite structures are MFI zeolites, including ZSM-5, structure directing agents include but are not limited to one or more of: those identified above for MFI zeolites; bifunctional dicationic molecules containing a long aliphatic chain (for example $C_{22}H_{45}$—$N^+(CH_3)_2$—$C_6H_{12}$—$N^+(CH_3)_2$—$C_6H_{13}$, denoted $C_{22\text{-}6\text{-}6}$, $C_{22}H_{45}$—$N^+(CH_3)_2$—$C_6H_{12}$—$N^+(CH_3)_2$—$C_3H_7$, denoted $C_{22\text{-}6\text{-}3}$, or a poly(ethylene glycol)); dual-porogenic surfactants; silylated polyethylenimine polymers; amphiphilic organosilanes; or hydrophilic cationic polyelectroyltes/polymers such as poly(diallyldimethylammonium chloride) (PDADMAC). In embodiments in which the target zeolite structures are beta zeolites, structure directing agents include but are not limited to one or more of: those identified above for beta zeolite; 4,4'trimethylene bis(N-methyl N-benzyl-piperidinium) hydroxide; 1,2-diazabicyclo 2,2,2, octane (DABCO); dialkylbenzyl ammonium hydroxide; dimethyldiisopropylammonium hydroxide (DMDPOH); N,N-dimethyl-2,6-cis-dimethylpiperdinium hydroxide (DMPOH); N-ethyl-N,N-dimethylcyclohexanaminium hydroxide (EDMCHOH); N,N,N-trimethylcyclohexanaminium hydroxide (TMCHOH); N-isopropyl-N- methyl-pyrrolidinium (iProOH); N-isobutyl-N-methyl-pyrrolidinium (iButOH); N-isopentyl-N-methyl-pyrrolidinium (iPenOH); or any of the thousands of structure directing agents for producing zeolite beta can be used, as disclosed in Daeyaerta et al., "Machine-learning approach to the design of OSDAs for zeolite beta," PNAS February, 116 (2019): 3413-3418. In embodiments in which the target zeolite structures are mordenite zeolite, structure directing agents include but are not limited to one or more of: those identified above for mordenite zeolite; mixed organic templates such as glycerol, ethylene glycol or polyethylene glycol; pyrrolidine-based mesoporogens; piperazine; 1,6-diaminohexane; diethylpiperidinium; or co-operative organic templates such as N,N,N-trimethyl-1,1-adamantammonium and 1,2-hexanediol. In embodiments in which the target zeolite structures are (CHA) zeolite, structure directing agents include but are not limited to one or more of comprising quaternary ammonium cations derived from adamantamine e.g., N,N,N-trimethyl-1-adamantammonium, derived from quinuclidinol e.g., N-methyl-3-quinuclidinol and derived from cyclohexyl/cyclohexylmethyl, e.g., trimethyl(cyclohexylmethyl)ammonium. Structure directing agents that can optionally be added for synthesis of SAPOs, AlPOs or MAPOs can be one or more known or developed structure directing agents, including but not limited to one or more of secondary and tertiary amine derived templates, quaternary ammonium derived templates, azamacrocycle derived templates, spiro templates, diaazabicyclo derived templates, or phosphazine based templates.

The disclosed process for synthesizing crystalline materials such as zeolite as disclosed herein can occur in the absence or presence of seed materials comprising zeolite structures of the same or similar crystalline framework structure as the target zeolite framework for production. For example: for MFI zeolites, suitable seed materials include ZSM-5 (MFI), ZSM-8 (MFI), ZSM-11 (MEL) and Silicalite-1 (MFI); for beta zeolites, other beta zeolites are used as seed materials; for mordenite zeolites, other mordenite zeolites are used as seed materials; for FAU zeolites, suitable seed materials are zeolite Y, zeolite X, USY zeolite, faujasite zeolite or small protozeolitic species (gels); for AlPOs, SAPOs and MAPOs, suitable seed materials are other AlPOs, SAPOs and MAPOs. Functions of the seeds can include, but are not limited to: supporting growth on the surface of the seed, that is, where crystallization does not undergo nucleation but rather crystal growth is directly on the surface of the seed; the parent gel and seed share common larger composite building units; the parent gel and seed share common smaller units, for instance 4 member rings; seeds that undergo partial dissolution to provide a surface for crystal growth of a zeolite; crystallization occurs through a "core-shell" mechanism with the seed acting as a core and the target material grows on the surface; and/or where the seeds partially dissolve providing essential building units that can orientate crystallization of the zeolite or other crystalline structure. In embodiments where zeolites comprise Silicalite-1, precursors and reagents effective for the crystalline material comprise a silica source, an optional alumina source, a mineralizer, a structure directing agent an optional seed material.

In the above embodiments in which a mineralizer is necessary, a hydroxide mineralizer is included as the hydroxide derived from the alkali metal source from the Periodic Table IUPAC Group 1 alkaline metals (and/or from the hydroxide of any hydroxide-containing structure directing agent). For example, these are selected from the group consisting of NaOH, KOH, RbOH, LiOH, CsOH and combinations thereof. In certain embodiments a Na-based hydroxide mineralizer is selected.

The mixing steps typically occur at ambient temperature and pressure (for instance about 20° C. and about 1 standard atmosphere), for a time is sufficient to realize a homogeneous distribution of the components. In certain embodiments the sol-gel can be aged before being subjected to subsequent hydrothermal treatment, for example for a period of about 0-48, 0-24, 0-5, 0.5-24 or 0.5-5 hours. Hydrothermal treatment is then carried out at a temperature in the range of about 100-200, 100-180, 100-160, 120-200, 120-180, 120-160 or 140-200° C. and at atmospheric or autogenous pressure (from the sol-gel or from the sol-gel plus an addition of a gas purge into the vessel prior to heating), and for a time period within the range of about 0.1-7, 0.2-7, 0,1-6, 0.2-6, 0.1-5 or 0.2-5 days, to ensure crystallization and formation of a zeolite gel or a gel for other crystalline material. As is known, these time periods and temperatures can vary depending on the desired zeolite or other crystalline material framework to be produced.

The products are washed, for example with water at a suitable quantity, for example at about twice the volume of the sol-gel solution. The wash can be at a temperature of from about 20-80° C. at atmospheric, vacuum or under pressure. The wash can continue until the pH of the filtrate approaches about 5-9, 5-7, or 7-9. The solids are recovered by filtration, for instance, using known techniques such as centrifugation, gravity, vacuum filtration, filter press, or rotary drums, and dried, for example at a temperature of up to about 110 or 150° C.

In certain embodiments, recovered precipitate is calcined at a suitable temperature, temperature ramp rate and for a suitable period of time. In certain embodiments, calcining is carried out to increase porosity. In certain embodiments, calcining is carried out to remove all or a portion of structure directing agent components that remain in the precipitate to realize porous zeolite. In optional embodiments in which calcination is carried out on zeolite produce, conditions for calcination can include temperatures in the range of about 350-700, 450-600, 500-700 or 500-600° C., atmospheric pressure, and a time period of about 3-24, 3-18, 6-24 or 6-18 hours. Calcining can occur with ramp rates in the range of from about 0.1-10, 0.1-5, 0.1-3, 1-10, 1-5 or 1-3° C. per minute. In certain embodiments calcination can have a first step ramping to a temperature of between about 100-150° C. with a holding time of from about 2-24 hours (at ramp rates of from about 0.1-5, 0.1-3, 1-5 or 1-3° C. per min) before increasing to a higher temperature with a final holding time in the range of about 2-24 hours.

It is to be appreciated by those skilled in the art that in certain embodiments effective baseline compositional ratios for synthesis of crystalline materials such as zeolites as disclosed herein can be determined by empirical data, for instance summarized as phase boundary diagrams or other methodologies as is known in material synthesis. In certain embodiments, baseline compositional ratios and conditions are effective, in the absence of water soluble ODSO, for synthesis one type or sub-type of crystalline material (zeolite or other crystalline material), or an amorphous material, and according to certain embodiments of the process herein, inclusion of water soluble ODSO results in shifting the material type out of the phase boundary diagram, even at approximately equivalent ratios, to a different type or sub-type of crystalline material, or an amorphous material.

In embodiments in which the crystalline material is a zeolite, effective ratios of precursors and reagents for production of zeolites herein are within those known to produce templated aluminosilicate zeolites and can be determined by those of ordinary skill in the art. For example, effective amounts of silica and alumina precursors are provided to produce synthesized zeolite having a silica-to-alumina ratio (SAR) in the range of about 2-10000, 2-5000, 2-500, 2-100, 2-80, 10-10000, 10-5000, 10-500, 10-100, 10-80, 50-10000, 50-5000, 50-1000, 50-500 or 50-100. The SAR levels in the synthesized zeolite depends on the type of zeolite; for instance: MFI zeolites including ZSM-5 have effective SAR (mol/mol) values in the synthesized zeolite in the range of about 20-1500, 20-1000, 20-500, 25-1500, 25-1000, 25-500, 50-1500, 50-1000, 50-500, 100-1500, 100-1000 or 100-500; *BEA zeolites and/or MOR zeolites have effective SAR (mol/mol) values in the synthesized zeolite of greater than 10, in certain embodiments in the range of about 10-10000, 10-5000, 10-500, 10-100, 10-80, 50-10000, 50-5000, 50-1000, 50-500 or 50-100; zeolite Y has effective SAR (mol/mol) values in the synthesized zeolite in the range of about 3-6. In embodiments in which a structure directing agent is used, an effective amount includes a molar ratio (normalized to 1 mole of $Al_2O_3$) in the range of about 0.1-75, 0.1-50, 0.1-30, 0.1-20, 0.1-15, 1-75, 1-50, 1-30, 1-20, 1-15, 2.5-75, 2.5-50, 2.5-30, 5-75, 5-50 or 5-30.

In certain embodiments, baseline compositional ratios of the aqueous composition used to produce zeolites herein include (on a molar basis):

$SiO_2/Al_2O_3$: 10-1500
$OH^-/SiO_2$: 0.05-3
$R/SiO_2$: 0-1.5
Alkali metal cation/$SiO_2$: 0.075-1.5
$H_2O/SiO_2$: 5-120 wherein R is the structure directing agent, and a level of 0 represents absence of the structure directing agent.
It is appreciated by those skilled in the art that these molar composition ratios can be expressed on a mass basis.

As is known, different ratios of materials are used depending on the desired zeolite to be produced. In the embodiments herein, ratios of components in homogeneous aqueous mixtures including water soluble ODSO are sometimes referred to as "water soluble ODSO-enhanced compositional ratios." In certain embodiments a water soluble ODSO-enhanced compositional ratio is one in which water soluble ODSO is included to replace an approximately equivalent mass of a certain amount of water in the homogeneous aqueous mixture, and wherein a cumulative amount of water soluble ODSO and water (water soluble ODSO+ $H_2O$) is approximately equivalent to a mass of water that is effective to produce the same or another type of zeolite, or an amorphous material, in the absence of water soluble ODSO. In certain embodiments: a baseline compositional ratio of silica, optional aluminum, a mineralizer, optional structure directing agent, optional seed and water is known or determined to be is effective to produce the same or another type of zeolite, or an amorphous material, in the absence of water soluble ODSO; a water soluble ODSO-enhanced compositional ratio is approximately equivalent to the baseline compositional ratio except for the substitution of water soluble ODSO for water on a mass basis; and wherein the conditions and time of heating the sol-gel having the water soluble ODSO-enhanced compositional ratio is approximately equivalent to those that are effective to produce the same or another type of zeolite, or an amorphous material, in the absence of water soluble ODSO.

The present disclosure includes one or more water-soluble ODSO compounds including ODSO compounds that are used as a component in a material synthesis process, wherein the supernatant contains one or more ODSO components or neutralized ODSO. The additional components can be a mixture that comprises two or more ODSO compounds. In the description herein, the terms "oxidized disulfide oil", "ODSO", "ODSO mixture" and "ODSO compound(s)" may be used interchangeably for convenience. As used herein, the abbreviations of oxidized disulfide oils ("ODSO") and disulfide oils ("DSO") will be understood to refer to the singular and plural forms, which may also appear as "DSO compounds" and "ODSO compounds," and each form may be used interchangeably. In certain instances, a singular ODSO compound may also be referenced.

As disclosed herein, in certain embodiments a water-soluble ODSO component includes a pH-modified water-soluble ODSO composition can be used. Such a pH-modified water-soluble ODSO composition is disclosed in U.S. patent application Ser. Nos. 17/850,158 and 17/850,115 filed on Jun. 27, 2022, hereinabove incorporated by reference. The pH-modified water-soluble ODSO composition comprises an acidic water-soluble ODSO composition and an alkaline agent. In certain embodiments, the pH-modified WS-ODSO composition provides a portion of requisite water to form the aqueous mixture. In certain embodiments, the pH-modified WS-ODSO composition provides sufficient water to avoid added utility water. In certain embodiments, the pH-modified WS-ODSO composition provides a portion of requisite mineralizer to homogeneous aqueous mixture to produce zeolite. In certain embodiments, the alkaline agent is selected from the group consisting of sodium hydroxide, calcium hydroxide, lithium hydroxide, strontium hydroxide, barium hydroxide, potassium hydroxide, cesium hydroxide, rubidium hydroxide, ammonia, ammonium hydroxide, lithium hydroxide, zinc hydroxide, trimethylamine, pyridine, beryllium hydroxide, magnesium hydroxide, and combinations of one of the foregoing alkaline agents. In certain embodiments, the alkaline agent is selected from the group consisting of sodium hydroxide, potassium hydroxide, rubidium hydroxide, lithium hydroxide, cesium hydroxide, and combinations of one of the foregoing alkaline agents.

As disclosed herein, in certain embodiments a water-soluble ODSO component includes supernatant from a prior synthesis that utilized water-soluble ODSO or neutralized ODSO. Such a process is disclosed in U.S. patent application Ser. No. 17/850,285 filed on Jun. 27, 2022, hereinabove incorporated by reference. In such a process, a first synthesis of a first material is carried out using water soluble ODSO as a component (as-is, or as a pH modified composition). All or a portion of a precipitate is separated from a supernatant, and that supernatant from an ODSO synthesis is used as a water-soluble ODSO component herein. In certain embodiments, the supernatant from an ODSO-enhanced synthesis provides a portion of requisite water to form the aqueous mixture. In certain embodiments, the supernatant from an ODSO-enhanced synthesis provides sufficient water to avoid added utility water. In certain embodiments, the supernatant from an ODSO-enhanced synthesis provides a portion of requisite mineralizer to homogeneous aqueous mixture to produce zeolite.

Note that the alkali metal source in the overall sol-gel, whether provided from the ODSO or from a separate mineralizer, is provide as a hydroxide, but in embodiments herein where the ratio is expressed based on the mass of the alkali, it may be expressed based on the metal itself. For instance, when the alkali is NaOH, the ODSO/Na ratio is determined by dividing the mass of the ODSO by the mass of the Na portion of NaOH, that is, about 57.5% of the NaOH mass. In certain embodiments, the effective amount of ODSO is that which results in the synthesis of zeolite is an ODSO/Na ratio (wt./wt.) in the range of about 0.1-11, 0.1-10, 0.1-9, 0.1-8, 0.1-7, 0.1-6, 0.1-5, 0.1-4, 0.1-3, 0.1-2, 0.1-1, 1-10, 1-9, 1-8, 1-7, 1-6, 1-5, 1-4, 1-3, 1-2, 2-10, 2-9, 2-8, 2-7, 2-6, 2-5, 2-4 or 2-3.

In certain embodiments, the alkali metal source sodium, the zeolite is ZSM-5 zeolite and the effective amount of ODSO is that which results in the synthesis of zeolite is an ODSO/Na ratio (wt./wt.) in the range of about 0.1-10, 0.1-8.5, 0.1-7, 1-10, 1-8.5, 1-7, 2-10, 2-8.5, or 2-7.

In certain embodiments, the alkali metal source sodium, the zeolite is CHA zeolite and the effective amount of ODSO is that which results in the synthesis of zeolite is an ODSO/Na ratio (wt./wt.) in the range of about 0.1-11 0.1-9, 0.1-7, 1-10, 1-9, 1-7, 2-10, 2-9, or 2-7. For this embodiment, the sodium content is from the alkali source and does not also include the sodium from the alumina source.

In certain embodiments, the alkali metal source sodium, the zeolite is FAU zeolite and the effective amount of ODSO is that which results in the synthesis of zeolite is an ODSO/Na ratio (wt./wt.) in the range of about 0.1-2.5, 0.1-2, 0.1-1, 0.5-2.5, 0.5-2, 0.5-1, 1-2.5, or 1-2.

It is noted that various factors can contribute to quantity of ODSO, including the type of zeolite formed, the ratios of other components, and the amount of mineralizer. In certain embodiments the basic components from all of the sources are provided in effective amounts so as to maintain the homogeneous mixture at a pH level of greater than or equal to about 9, for example in the range of about 9-14, 9-13, 10-14, 10-13, 11-14 or 11-13. It is appreciated that the overall pH is influenced by anions from the ODSO component as a pH-modified ODSO composition, an optional hydroxide mineralizer source, and in certain embodiments anions from other sources such as from an alumina source or a silica source. In certain embodiments hydroxide anions are provided from the ODSO and a mineralizer from an alkali metal source, a structure directing agent, or both a mineralizer from an alkali metal source and a structure directing agent. In certain embodiments hydroxide anions are provided from a pH modified ODSO composition and a mineralizer from an alkali metal source, a structure directing agent, or both a mineralizer from an alkali metal source and a structure directing agent. In the process herein, the pH is reduced by the presence of ODSO, therefore, the quantity of the basic compound from one or more of the aforementioned sources can be adjusted accordingly to attain the requisite pH.

In certain embodiments, the one or more ODSO compounds are contained in a mixture with one or more catalytically active components and ODSO, as an active component carrier composition (as disclosed in co-pending and commonly owned U.S. application Ser. No. 17/720,434 filed Apr. 14, 2022, entitled "Active Component Carrier Composition, and Method for Manufacture of Catalyst Materials," which is incorporated by reference herein in its entirety). One or more catalytically active components are included in a mixture with one or more ODSO compounds. The one or more active components can vary, depending upon the application of the catalyst being manufactured. The active component can be a metal or a non-metal, in elemental form or as a compound such as oxides, carbides or sulfides. For instance, one or more active components for hydrotreating catalysts can include one or more metals or metal compounds selected from the Periodic Table of the Elements IUPAC Groups 4-12. In certain embodiments one or more active components are selected for producing hydrotreating catalysts and can include one or more metals or metal compounds selected from the Periodic Table of the Elements IUPAC Groups 6-10 (for example Co, Ni, Mo, and combinations thereof). In certain embodiments one or more active components are selected for producing hydrocracking catalysts and can include one or more metals or metal compounds selected from the Periodic Table of the Elements IUPAC Groups 6-10 (for example Co, Ni, W, Mo, and combinations thereof). In certain embodiments one or more active components are selected for producing catalytic reforming catalysts and can include one or more metals or metal compounds selected from the Periodic Table of the Elements IUPAC Groups 8-10 (for example Pt or Pd). In certain embodiments one or more active components are selected for producing hydrogenation catalysts and can include one or more metals or metal compounds selected from the Periodic Table of the Elements IUPAC Groups 7-10 (for example Pt or Pd), and/or one or more non-metal compound such as P. In certain embodiments one or more active components are selected for producing oxidation catalysts and can include one or more metals or metal compounds selected from the Periodic Table of the Elements IUPAC Groups 4-10 (for example Ti, V, Mn, Co, Fe, Cr and Mo) or from the Periodic Table of the Elements IUPAC Groups 4-12 (for example Ti, V, Mn, Co, Fe, Cr, Cu, Zn, W, Mo).

In certain embodiments, the produced aqueous liquid mixture comprises one or more ODSO compounds that are contained in reaction products, or a fraction of reaction products, derived from controlled catalytic oxidation of disulfide oil compounds in the presence of an oxidation catalyst containing one or more transition metals. For example, as described above and in commonly owned U.S. Pat. No. 10,807,947 which is incorporated by reference herein in its entirety, a controlled catalytic oxidation of MEROX process by-products DSO can be carried out. The resulting oxidized effluents contain ODSO. As disclosed in 10,807,947, the by-product DSO compounds from the mercaptan oxidation process can be oxidized, typically in the presence of a catalyst. The oxidant can be a liquid peroxide selected from the group consisting of alkyl hydroperoxides, aryl hydroperoxides, dialkyl peroxides, diaryl peroxides, peresters and hydrogen peroxide. The oxidant can also be a gas, including air, oxygen, ozone and oxides of nitrogen. In embodiments herein, a catalyst is used in the oxidation process. The oxidation catalyst can contain one active metals from IUPAC Groups 4-10 or from Groups 4-12 of the Periodic Table. In certain embodiments oxidation catalyst are metals or metal compounds containing one or more transition metals. In certain embodiments oxidation catalyst are metals or metal compounds containing one or more metals selected from the group consisting of Ti, V, Mn, Co, Fe, Cr, Cu, Zn, W, Mo and combinations thereof. In certain embodiments oxidation catalyst are compounds containing one or more metals or metal compounds selected from the group consisting of Mo, W, V, Ti, and combinations thereof. In certain embodiments oxidation catalyst are compounds containing one or more metals or metal compounds selected from the group consisting of Mo (VI), W (VI), V (V), Ti (IV), and combinations thereof. In certain embodiments, suitable homogeneous catalysts include molybdenum acetylacetonate, bis(acetylacetonate) dioxomolybdenum, molybdenum naphthenate, molybdenum hexacarbonyl, tungsten hexacarbonyl, sodium tungstate and vanadium pentoxide. In certain embodiments, a suitable catalyst is sodium tungstate, $Na_2WO_4 \cdot 2H_2O$.

In certain embodiments ODSO is obtained from controlled catalytic oxidation of disulfide oils from mercaptan oxidation processes. The effluents from controlled catalytic oxidation of disulfide oils from mercaptan oxidation processes includes ODSO compounds and in certain embodiments DSO compounds that were unconverted in the oxidation process. In certain embodiments this effluent contains water-soluble compounds and water-insoluble compounds. The effluent contains at least one ODSO compound, or a mixture of two or more ODSO compounds, selected from the group consisting of compounds having the general formula (R—SO—S—R'), (R—SOO—S—R'), (R—SOO—SO—R'), (R—SOO—SOO—R'), (R—SO—SO—R'), (R—SO—SOO—OH), (R—SOO—SOO—OH), (R—SO—SO—OH), (R—SOO—SO—OH), (R'—SO—SO—OR), (R'—SOO—SO—OR), (R'—SO—SOO—OR) and (R'—SOO—SOO—OR). In certain embodiments, in the above formulae R and R' are C1-C10 alkyl or C6-C10 aryl groups. It will be understood that since the source of the DSO is a refinery feedstream, the R and R' substituents vary, e.g., methyl and ethyl subgroups, and the number of sulfur atoms, S, in the as-received feedstream to oxidation can extend to 3, for example, trisulfide compounds.

In embodiments herein the water-soluble compounds and water-insoluble compounds are separated from one another, and the ODSO used herein comprises all or a portion of the water-soluble compounds separated from the total effluents from oxidation of disulfide oils from mercaptan oxidation processes. For example, the different phases can be separated by decantation or partitioning with a separating funnel, separation drum, by decantation, or any other known apparatus or process for separating two immiscible phases from one another. In certain embodiments, the water-soluble and water-insoluble components can be separated by distillation as they have different boiling point ranges. It is understood that there will be crossover of the water-soluble and water-insoluble components in each fraction due to solubility of components, typically in the ppmw range (for instance, about 1-10,000, 1-1,000, 1-500 or 1-200 ppmw). In certain embodiments, contaminants from each phase can be removed, for example by stripping or adsorption.

In certain embodiments ODSO used herein comprises, consists of or consists essentially of at least one ODSO compound having 3 or more oxygen atoms that is selected from the group consisting of compounds having the general formula (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR). In certain embodiments ODSO used herein comprises, consists of or consists essentially of a mixture or two or more ODSO compounds having 3 or more oxygen atoms, that is selected from the group consisting of compounds having the general formula (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR). In certain embodiments ODSO used herein comprises, consists of or consists essentially of ODSO compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), and mixtures thereof. In certain embodiments, in the above formulae R and R' are C1-C10 alkyl or C6-C10 aryl groups. In certain embodiments, the R and R' are methyl and/or ethyl groups. In certain embodiments, the WS-ODSO compound(s) used herein have 1 to 20 carbon atoms.

In certain embodiments, the ODSO compounds used herein comprise, consist of or consist essentially of ODSO compounds having an average density greater than about 1.0 g/cc. In certain embodiments, the ODSO compounds used herein comprise, consist of or consist essentially of ODSO compounds having an average boiling point greater than about 80° C. In certain embodiments, the ODSO compounds used herein comprise, consist of or consist essentially of ODSO compounds having a dielectric constant that is less than or equal to 100 at 0° C.

Table 1 includes examples of polar ODSO compounds that contain 3 or more oxygen atoms. In certain embodiments the identified ODSO compounds are obtained from a water-soluble fraction of the effluents from oxidation of DSO obtained from MEROX by-products. The ODSO compounds that contain 3 or more oxygen atoms are water-soluble over effectively all concentrations, for instance, with some minor amount of acceptable tolerance for carry over components from the effluent stream and in the water insoluble fraction with 2 oxygen atoms of no more than about 1, 3 or 5 mass percent.

In certain embodiments the ODSO compounds contained in an oxidation effluent stream that is derived from controlled catalytic oxidation of MEROX process by-products, DSO compounds, as disclosed in U.S. Pat. Nos. 10,807,947 and 10,781,168 and as incorporated herein by reference above.

In some embodiments, the ODSO are derived from oxidized DSO compounds present in an effluent refinery hydrocarbon stream recovered following the catalytic oxidation of mercaptans present in the hydrocarbon stream. In some embodiments, the DSO compounds are oxidized in the presence of a catalyst.

As noted above, the designation "MEROX" originates from the function of the process itself, that is, the conversion of mercaptans by oxidation. The MEROX process in all of its applications is based on the ability of an organometallic catalyst in a basic environment, such as a caustic, to accelerate the oxidation of mercaptans to disulfides at near ambient temperatures and pressures. The overall reaction can be expressed as follows:

$$RSH + 1/4\ O_2 \rightarrow 1/2\ RSSR + 1/2\ H_2O \quad (1)$$

where R is a hydrocarbon chain that may be straight, branched, or cyclic, and the chains can be saturated or unsaturated. In most petroleum fractions, there will be a mixture of mercaptans so that the R can have 1, 2, 3 and up to 10 or more carbon atoms in the chain. This variable chain length and type is indicated by R and R' in the reaction. The reaction is then written:

$$2\ R'SH + 2\ RSH + O_2 \rightarrow 2\ R'SSR + 2\ H_2O \quad (2)$$

This reaction occurs spontaneously whenever any sour mercaptan-bearing distillate is exposed to atmospheric oxygen, but proceeds at a very slow rate. In addition, the catalyzed reaction (1) set forth above requires the presence of an alkali caustic solution, such as aqueous sodium hydroxide. The mercaptan oxidation proceeds at an economically practical rate at moderate refinery downstream temperatures.

The MEROX process can be conducted on both liquid streams and on combined gaseous and liquid streams. In the case of liquid streams, the mercaptans are converted directly to disulfides which remain in the product so that there is no reduction in total sulfur content of the effluent stream. The MEROX process typically utilizes a fixed bed reactor system for liquid streams and is normally employed with charge stocks having end points above 135° C.-150° C. Mercaptans are converted to disulfides in the fixed bed reactor system over a catalyst, for example, an activated charcoal impregnated with the MEROX reagent, and wetted with caustic solution. Air is injected into the hydrocarbon feedstream ahead of the reactor and in passing through the catalyst-impregnated bed, the mercaptans in the feed are oxidized to disulfides. The disulfides are substantially insoluble in the caustic and remain in the hydrocarbon phase. Post treatment is required to remove undesirable by-products resulting from known side reactions such as the neutralization of $H_2S$, the oxidation of phenolic compounds, entrained caustic, and others.

The vapor pressures of disulfides are relatively low compared to those of mercaptans, so that their presence is much less objectionable from the standpoint of odor; however, they are not environmentally acceptable due to their sulfur content and their disposal can be problematical.

In the case of mixed gas and liquid streams, extraction is applied to both phases of the hydrocarbon streams. The degree of completeness of the mercaptan extraction depends upon the solubility of the mercaptans in the alkaline solution, which is a function of the molecular weight of the individual mercaptans, the extent of the branching of the mercaptan molecules, the concentration of the caustic soda and the temperature of the system. Thereafter, the resulting DSO compounds are separated, and the caustic solution is regenerated by oxidation with air in the presence of the catalyst and reused.

Referring to the attached drawings, FIG. 1 is a simplified schematic of a generalized version of a conventional MEROX process employing liquid-liquid extraction for removing sulfur compounds. A MEROX unit 1010, is provided for treating a mercaptan containing hydrocarbon stream 1001. In some embodiments, the mercaptan containing hydrocarbon stream 1001 is LPG, propane, butane, light naphtha, kerosene, jet fuel, or a mixture thereof. The process generally includes the steps of: introducing the hydrocarbon stream 1001 with a homogeneous catalyst into an extraction vessel 1005 containing a caustic solution 1002, in some embodiments, the catalyst is a homogeneous cobalt-based catalyst; passing the hydrocarbon catalyst stream in countercurrent flow through the extraction section of the extraction 1005 vessel in which the extraction section includes one or more liquid-liquid contacting extraction decks or trays (not shown) for the catalyzed reaction with the circulating caustic solution to convert the mercaptans to water-soluble alkali metal alkane thiolate compounds; withdrawing a hydrocarbon product stream 1003 that is free or substantially free of mercaptans from the extraction vessel 1005, for instance, having no more than about 1000, 100, 10 or 1 ppmw mercaptans; recovering a combined spent caustic and alkali metal alkane thiolate stream 1004 from the extraction vessel 1005; subjecting the spent caustic and alkali metal alkane thiolate stream 1004 to catalyzed wet air oxidation in a reactor 1020 into which is introduced catalyst 1005 and air 1006 to provide the regenerated spent caustic 1008 and convert the alkali metal alkane thiolate compounds to disulfide oils; and recovering a by-product stream 1007 of DSO compounds and a minor proportion of other sulfides such as mono-sulfides and tri-sulfides. The effluents of the wet air oxidation step in the MEROX process can comprise a minor proportion of sulfides and a major proportion of disulfide oils. As is known to those skilled in the art, the composition of this effluent stream depends on the effectiveness of the MEROX process, and sulfides are assumed to be carried-over material. A variety of catalysts have been developed for the commercial practice of the process. The efficiency of the MEROX process is also a function of the amount of $H_2S$ present in the stream. It is a common refinery practice to install a prewashing step for $H_2S$ removal.

An enhanced MEROX process ("E-MEROX") is a modified MEROX process where an additional step is added, in which DSO compounds are oxidized with an oxidant in the presence of a catalyst to produce a mixture of ODSO compounds. The by-product DSO compounds from the mercaptan oxidation process are oxidized, in some embodiments in the presence of a catalyst, and constitute an abundant source of ODSO compounds that are sulfoxides, sulfonates, sulfinates, sulfones and their corresponding di-sulfur mixtures. The disulfide oils having the general formula RSSR' (wherein R and R' can be the same or different and can have 1, 2, 3 and up to 10 or more carbon atoms) can be oxidized without a catalyst or in the presence of one or more catalysts to produce a mixture of ODSO compounds. The oxidant can be a liquid peroxide selected from the group consisting of alkyl hydroperoxides, aryl hydroperoxides, dialkyl peroxides, diaryl peroxides, peresters and hydrogen peroxide. The oxidant can also be a gas, including air, oxygen, ozone and oxides of nitrogen. If a catalyst is used in the oxidation of the disulfide oils having the general formula RSSR' to produce the ODSO compounds, it can be a heterogeneous or homogeneous oxidation catalyst. The oxidation catalyst can be selected from one or more heterogeneous or homogeneous catalyst comprising metals from the IUPAC Group 4-12 of the Periodic Table, including Ti, V, Mn, Co, Fe, Cr, Cu, Zn, W and Mo. The catalyst can be a homogeneous water-soluble compound that is a transition metal containing an active species selected from the group consisting of Mo (VI), W (VI), V (V), Ti (IV), and combinations thereof. In certain embodiments, suitable homogeneous catalysts include molybdenum naphthenate, sodium tungstate, molybdenum hexacarbonyl, tungsten hexacarbonyl, sodium tungstate and vanadium pentoxide. An exemplary catalyst for the controlled catalytic oxidation of MEROX process by-products DSO is sodium tungstate, $Na_2WO_4 \cdot 2H_2O$. In certain embodiments, suitable heterogeneous catalysts include Ti, V, Mn, Co, Fe, Cr, W, Mo, and combinations thereof deposited on a support such as alumina, silica-alumina, silica, natural zeolites, synthetic zeolites, and combinations comprising one or more of the above supports.

The oxidation of DSO typically is carried out in an oxidation vessel selected from one or more of a fixed-bed reactor, an ebullated bed reactor, a slurry bed reactor, a moving bed reactor, a continuous stirred tank reactor, and a tubular reactor. The ODSO compounds produced in the E-MEROX process generally comprise two phases: a water-soluble phase and water-insoluble phase, and can be separated into the aqueous phase containing water-soluble ODSO compounds and a non-aqueous phase containing water-insoluble ODSO compounds. The E-MEROX process can be tuned depending on the desired ratio of water-soluble to water-insoluble compounds presented in the product ODSO mixture. Partial oxidation of DSO compounds results in a higher relative amount of water-insoluble ODSO compounds present in the ODSO product and a near or almost complete oxidation of DSO compounds results in a higher relative amount of water-soluble ODSO present in the ODSO product. Details of the ODSO compositions are discussed in the U.S. Pat. No. 10,781,168, which is incorporated herein by reference above.

FIG. 2 is a simplified schematic of an E-MEROX process that includes E-MEROX unit 1030. The MEROX unit 1010 unit operates similarly as in FIG. 1, with similar references numbers representing similar units/feeds. In FIG. 2, the effluent stream 1007 from the generalized MEROX unit of FIG. 1 is treated. It will be understood that the processing of the mercaptan containing hydrocarbon stream of FIG. 2 is illustrative only and that separate streams of the products, and combined or separate streams of other mixed and longer chain products can be the subject of the process for the recovery and oxidation of DSO to produce ODSO compounds, that is the E-MEROX process. In order to practice the E-MEROX process, apparatus are added to recover the by-product DSO compounds from the MEROX process. In addition, a suitable reactor 1035 add into which the DSO compounds are introduced in the presence of a catalyst 1032 and an oxidant 1034 and subjecting the DSO compounds to a catalytic oxidation step to produce the mixed stream 1036 of water and ODSO compounds. A separation vessel 1040 is provided to separate the by-product 1044 from the ODSO compounds 1042.

The oxidation to produce OSDO can be carried out in a suitable oxidation reaction vessel operating at a pressure in the range from about 1-30, 1-10 or 1-3 bars. The oxidation to produce OSDO can be carried out at a temperature in the range from about 20-300, 20-150, 20-90, 45-300, 15-150 or 45-90° C. The molar feed ratio of oxidizing agent-to-monosulfur can be in the range of from about 1:1 to 100:1, 1:1 to 30:1 or 1:1 to 4:1. The residence time in the reaction vessel can be in the range of from about 5-180, 5-90, 5-30, 15-180, 15-90 or 5-30 minutes. In certain embodiments, oxidation of DSO is carried out in an environment without added water as a reagent. The by-products stream 1044 generally comprises wastewater when hydrogen peroxide is used as the oxidant. Alternatively, when other organic peroxides are used as the oxidant, the by-products stream 1044 generally comprises the alcohol of the peroxide used. For example, if butyl peroxide is used as the oxidant, the by-product alcohol 1044 is butanol.

In certain embodiments water-soluble ODSO compounds are passed to a fractionation zone (not shown) for recovery following their separation from the wastewater fraction. The fractionation zone can include a distillation unit. In certain embodiments, the distillation unit can be a flash distillation unit with no theoretical plates in order to obtain distillation cuts with larger overlaps with each other or, alternatively, on other embodiments, the distillation unit can be a flash distillation unit with at least 15 theoretical plates in order to have effective separation between cuts. In certain embodiments, the distillation unit can operate at atmospheric pressure and at a temperature in the range of from 100° C. to 225° C. In other embodiments, the fractionation can be carried out continuously under vacuum conditions. In those embodiments, fractionation occurs at reduced pressures and at their respective boiling temperatures. For example, at 350 mbar and 10 mbar, the temperature ranges are from 80° C. to 194° C. and 11° C. to 98° C., respectively. Following fractionation, the wastewater is sent to the wastewater pool (not shown) for conventional treatment prior to its disposal. The wastewater by-product fraction can contain a small amount of water-insoluble ODSO compounds, for example, in the range of from 1 ppmw to 10,000 ppmw. The wastewater by-product fraction can contain a small amount of water-soluble ODSO compounds, for example, in the range of from 1 ppmw to 50,000 ppmw, or 100 ppmw to 50,000 ppmw. In embodiments where alcohol is the by-product alcohol, the alcohol can be recovered and sold as a commodity product or added to fuels like gasoline. The alcohol by-product fraction can contain a small amount of water-insoluble ODSO compounds, for example, in the range of from 1 ppmw to 10,000 ppmw. The alcohol by-product fraction can contain a small amount of water-soluble ODSO compounds, for example, in the range of from 100 ppmw to 50,000 ppmw.

Examples

The below examples and data are exemplary. It is to be understood that other ratios and types of aluminum sources, silica sources, bases and structure directing agents can be used as compared to the examples.

Figures 3A, 3B:
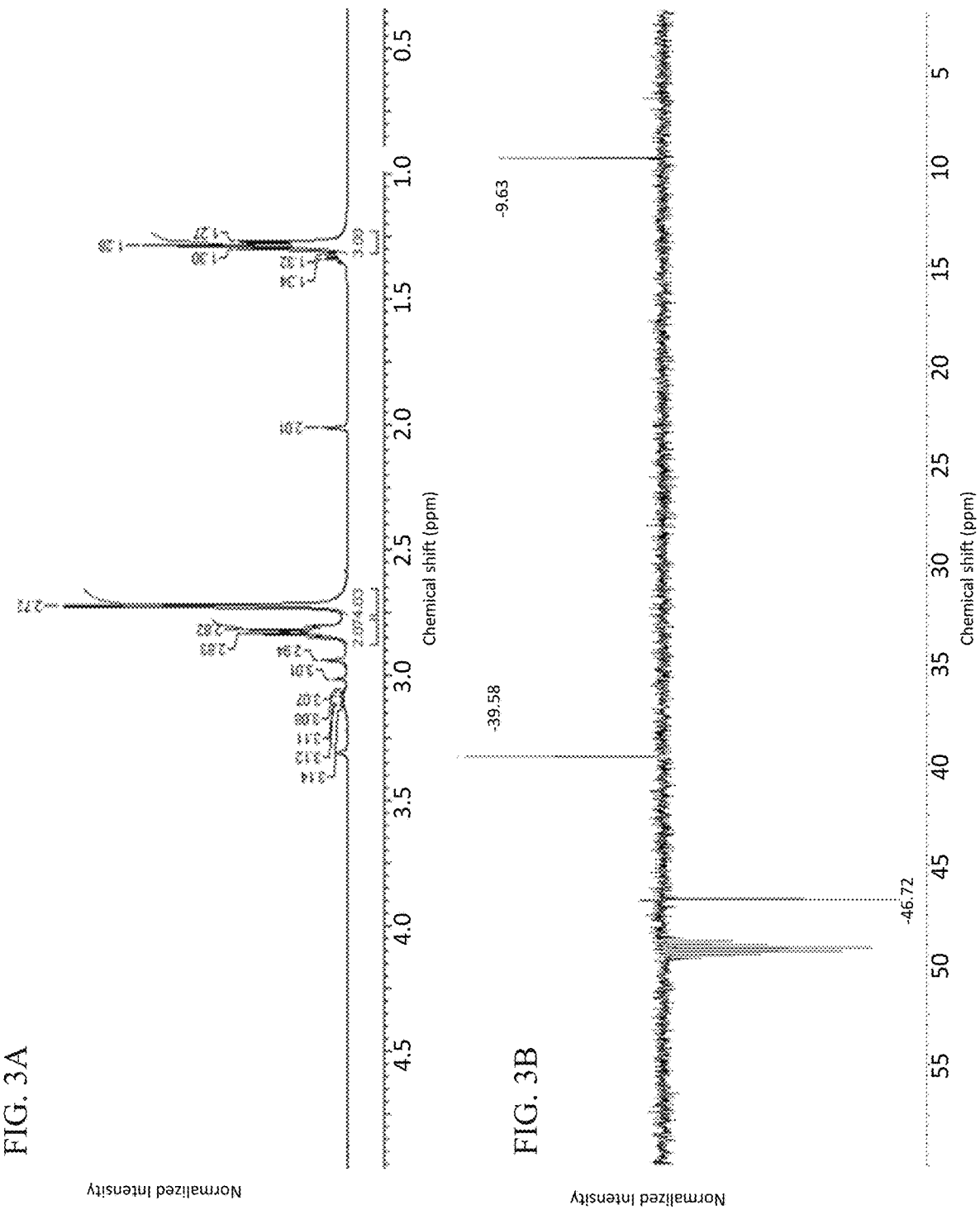
FIG. 3A is the experimental $^1$H-NMR spectrum of the polar, water-soluble ODSO fraction used in an example herein.
FIG. 3B is the experimental $^{13}$C-DEPT-135-NMR spectrum of the polar, water-soluble ODSO fraction used in an example herein.

Reference Example: The ODSO mixture used in the Example below was produced as disclosed in U.S. Pat. No. 10,781,168, incorporated by reference above, and in particular the fraction referred to therein as Composition 2. Catalytic oxidation a hydrocarbon refinery feedstock having 98 mass percent of C1 and C2 disulfide oils was carried out. The oxidation of the DSO compounds was performed in batch mode under reflux at atmospheric pressure, that is, approximately 1.01 bar. The hydrogen peroxide oxidant was added at room temperature, that is, approximately 23° C. and produced an exothermic reaction. The molar ratio of oxidant-to-DSO compounds (calculated based upon monosulfur content) was 2.90. After the addition of the oxidant was complete, the reaction vessel temperature was set to reflux at 80° C. for approximately one hour after which the water soluble ODSO was produced (referred to as Composition 2 herein and in U.S. Pat. No. 10,781,168) and isolated after the removal of water. The catalyst used in the oxidation of the DSO compounds was sodium tungstate. The Composition 2, referred to herein as "the selected water soluble ODSO fraction," was used. FIG. 3A is the experimental $^1$H-NMR spectrum of the polar, water soluble ODSO mixture that is the selected water soluble ODSO fraction in the example herein. FIG. 3B is the experimental $^{13}$C-DEPT-135-NMR spectrum of the polar, water soluble ODSO mixture that is the selected water soluble ODSO fraction in the example herein. The selected water soluble ODSO fraction was mixed with a $CD_3OD$ solvent and the spectrum was taken at 25° C. Methyl carbons have a positive intensity while methylene carbons exhibit a negative intensity. The peaks in the 48-50 ppm region belong to carbon signals of the $CD_3OD$ solvent.

When comparing the experimental $^{13}$C-DEPT-135-NMR spectrum of FIG. 3B for the selected water soluble ODSO fraction with a saved database of predicted spectra, it was found that a combination of the predicted alkyl-sulfoxidesulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH) most closely corresponded to the experimental spectrum. This suggests that alkyl-sulfoxidesulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH) are major compounds in the selected water soluble ODSO fraction. It is clear from the NMR spectra shown in FIGS. 3A and 3B that the selected water soluble ODSO fraction comprises a mixture of ODSO compounds that form the ODSO composition used in the present examples.

Comparative Example 1: A sol-gel composition having the following molar ratio was formed by mixing aluminum nitrate, sodium hydroxide, tetrapropylammonium hydroxide and water:

100 $SiO_2$:1 $Al_2O_3$:13.4 $Na_2O$:20 TPA:2000 $H_2O$.

Once homogenized and the components dissolved, a colloidal silica was added and the resulting sol-gel stirred until homogenized. The contents were positioned within an autoclave and subjected to hydrothermal treatment under agitation and heated to a temperature of 185° C. and maintained under isothermal conditions for a desired time. The products were washed with distilled water before drying at 110° C. As-made samples were calcined at 550° C. (2° C./min ramp rate to 150° C., hold for 5 hrs., 1.5° C./min ramp rate to 550° C.) for 8 hours to render the ZSM-5 zeolite product porous.

Example 1: A sol-gel composition, similar to that of Comparative Example 1, having the following molar ratio was formed by mixing aluminum nitrate, sodium hydroxide, tetrapropylammonium hydroxide and water:

100 $SiO_2$:1 $Al_2O_3$:13.4 $Na_2O$:20 TPA:2000 $H_2O$.

Once homogenized and the components dissolved, a colloidal silica was added and the resulting sol-gel stirred until homogenized.

In the formation of this composition, 6.6 wt. % of the total water in the composition of Comparative Example 1 was substituted with the water-soluble ODSO. The ODSO/Na (g/g)=3.68.

The contents were positioned within an autoclave and subjected to hydrothermal treatment under agitation and heated to a temperature of 185° C. and maintained under isothermal conditions for a desired time. The products were washed with distilled water before drying at 110° C. As-made samples were calcined at 550° C. (2° C./min ramp rate to 150° C., hold for 5 hrs., 1.5° C./min ramp rate to 550° C.) for 8 hours to render the ZSM-5 zeolite product porous.

Figure 4A:
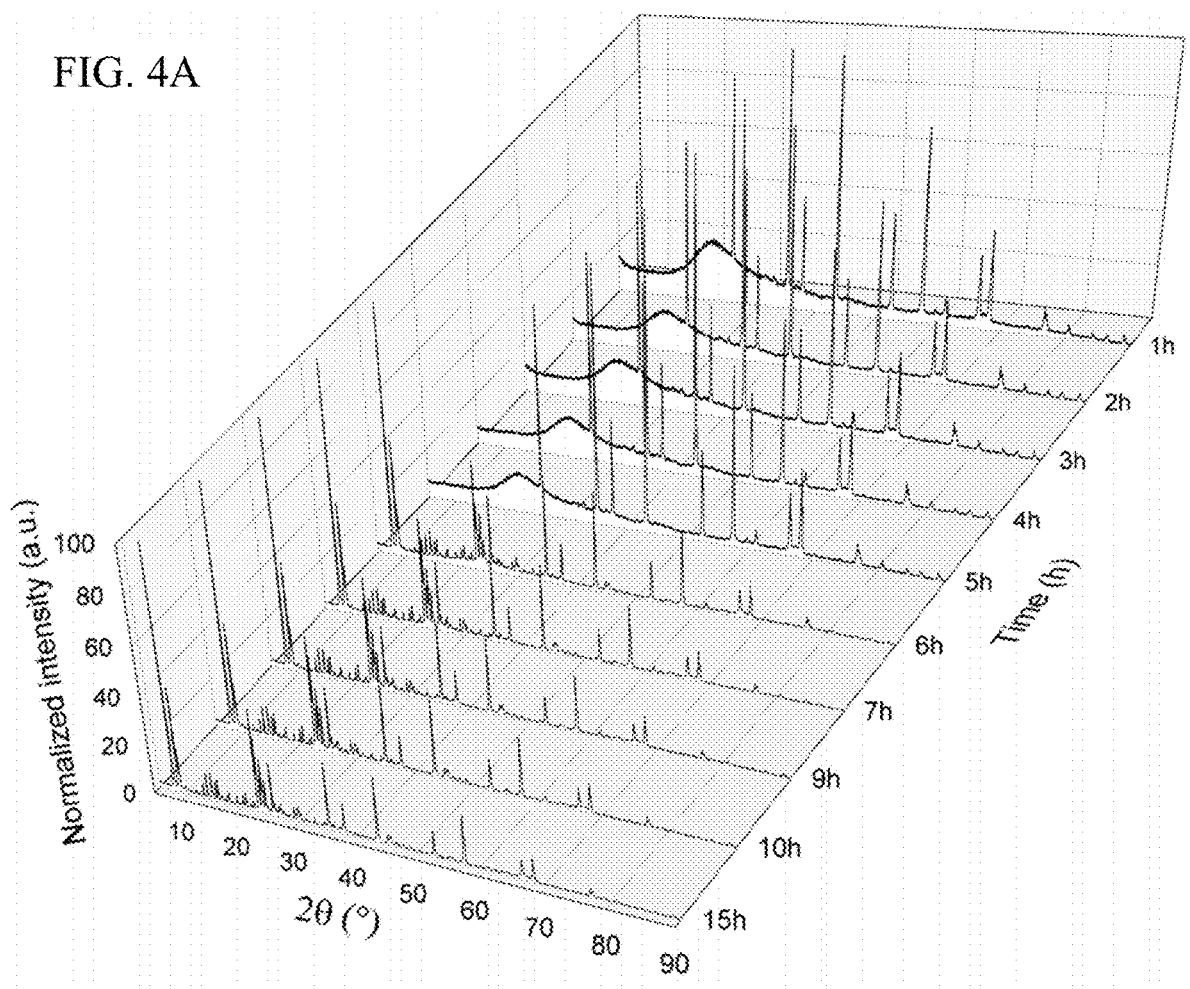
FIG. 4A is the experimental X-ray diffraction (XRD) spectra of calcined products synthesized from a sol-gel in the absence of water-soluble ODSO.
Figure 4B:
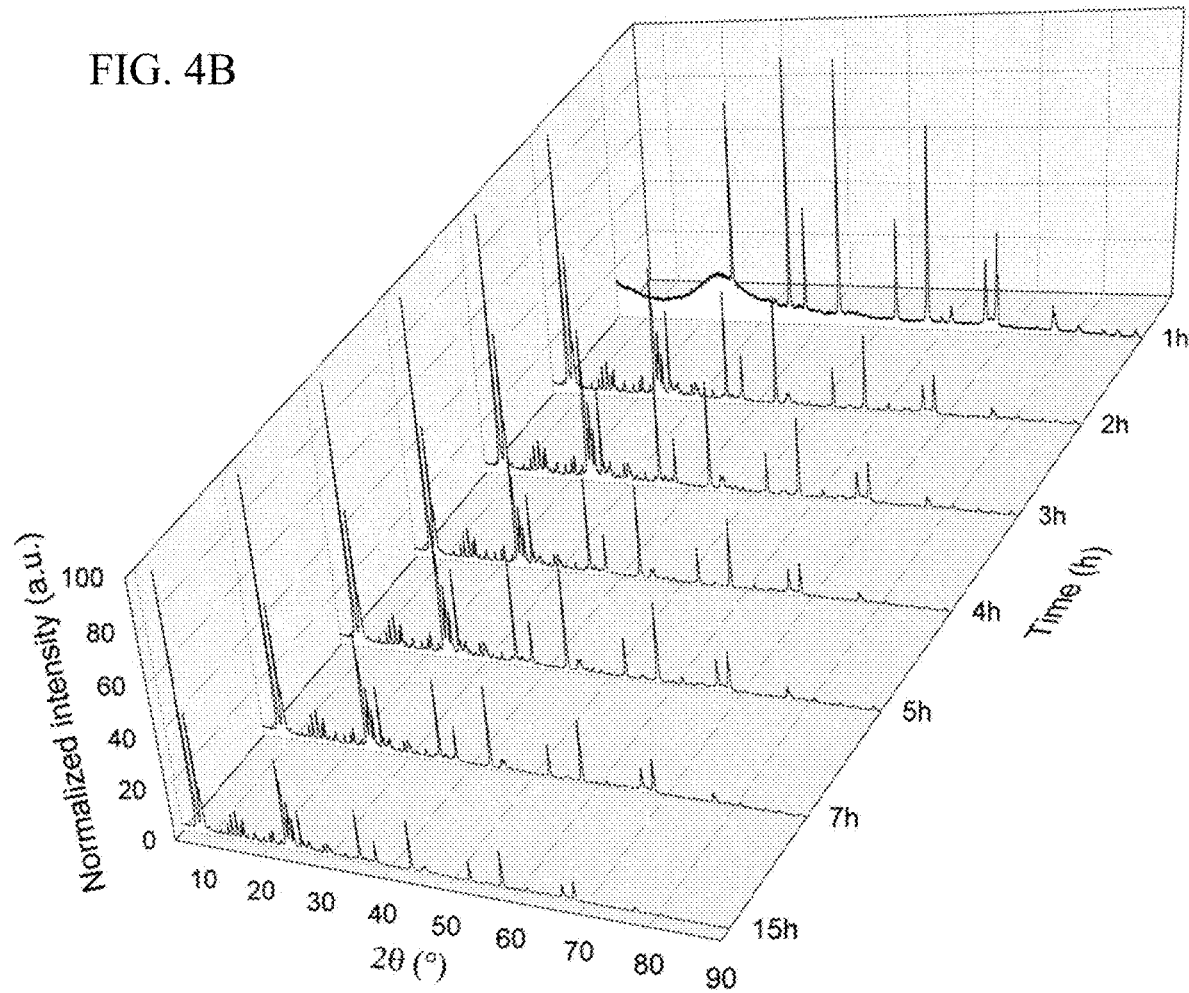
FIG. 4B is the experimental XRD spectra of calcined products synthesized from a sol-gel in the presence of water-soluble ODSO.

FIG. 4A is the experimental XRD spectra of calcined products synthesized from a sol-gel in the absence of water-soluble ODSO. FIG. 4B is the experimental XRD spectra of calcined products synthesized from a sol-gel in the presence of water-soluble ODSO. Both FIGS. 4a and 4b show the calcined XRD patterns of the products after mixing with alpha-alumina as an internal standard (50 wt. %/50 wt. %). The XRD patterns are each normalized by their respective maximum peak height. Depending on the crystallization time, the products are amorphous materials, crystalline zeolites of ZSM-5 having (MFI) structure, or a combination of, amorphous silica and ZSM-5 possessing varying degree of crystallinity. The XRD patterns show that with ODSO, ZSM-5 forms at a lower crystallization time when compared with the products deriving from an equivalent sol-gel in the absence of ODSO under equivalent processing conditions.

Figure 5:
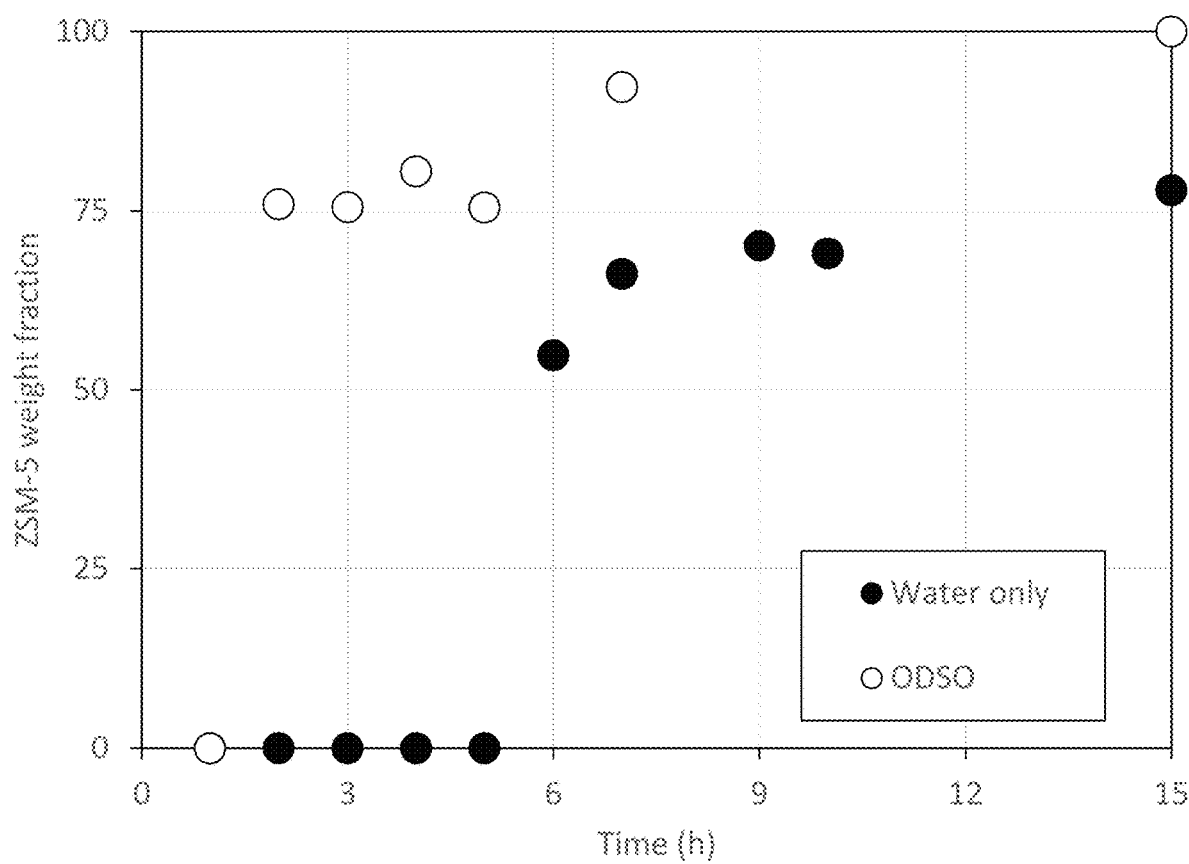
FIG. 5 is a graph showing the ZSM-5 weight fraction as a function of crystallization time.

FIG. 5 shows the ZSM-5 weight fraction of the calcined products as a function of crystallization time normalized (100%) to the product having the highest degree of ZSM-5 weight fraction from the series (FIG. 4B, 15 hours with ODSO).

The fraction of crystalline zeolite in all samples was determined by an internal standard method, which is the most commonly used method for amorphous determination via powder XRD (Ian C. Madsen, Nicola V. Y. Scarlett and Arnt Kern, Z. Kristallogr. 226 (2011) 944-955). The method involves adding a known amount of a standard material of known composition to an unknown sample. Herein, an u-alumina standard was mixed with a 1:1 weight ratio to each sample prior to the measurement of optimized x-ray datasets. The relative proportions Rp of each phase are calculated during Rietveld refinement according to the algorithm of Hill [R. J. HILL, J. Appl. Cryst. (1987). 20, 467-474] given in equation 3:

$$R_p = 100 \times \frac{S_p(ZMV)_p}{\sum_i S_i(ZMV)_i} \quad (3)$$

wherein S=the Rietveld scale factor, which is a parameter that is sample and phase dependent,
Z=the number of formula units per unit cell,
M=the mass of the formula unit,
V=the unit-cell volume,
i=number of phases in sample, and
p=a particular phase.

As is known in the art, prior knowledge of the crystalline phases and the characteristics of the sample is required. This is usually determined comparing the position and intensity of the experimental reflections with those calculated by a structure database (e.g., ICSD, ICDD).

By using a known weight fraction of a crystalline internal standard material, the reported concentrations can be corrected proportionately according to:

$$\text{Corr}(R_p) = R_p \times \frac{W_{Std}}{R_{Std}} \quad (4)$$

where $W_{Std}(\%)$ is the weighed concentration of the internal standard and $R_{Std}(\%)$ is the Rietveld analyzed concentration of the internal standard.

The overall amorphous content, A (%) is obtained from the following equation 5, which can be easily derived by considering a standard free of amorphous phases:

$$A = 100 - W_{Std} - \sum \text{Corr}(R_p) \quad (5)$$

The fraction of crystalline zeolite in sample (C) is then simply given by:

$$C = 100 - A. \quad (6)$$

From FIG. 5 it is clear that the sol-gel comprising the water soluble ODSO forms ZSM-5 significantly earlier and at a higher degree of crystallinity. It is evident that for the equivalent sol-gel subjected to the same process conditions the sol-gel comprising the water-soluble ODSO increases the fraction of crystalline ZSM (hollow circles are higher on the x-axis for equivalent time) and reduces crystallization time (hollow circles are further to the left for a fixed relative crystallinity). Hence, the use of water-soluble ODSO as an additional sol-gel component is demonstrated to reduce the time for synthesis and to yield an improved product with respect to crystallinity.

As used herein, "approximately equivalent" as concerning the amount of ODSO that replaces water, the cumulative amount of ODSO and water, the component molar or mass ratios, and/or the hydrolysis conditions and time, is within a margin of less than or equal to plus or minus 1, 2, 5 or 10% of the compared value.

It is to be understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms ""including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

TABLE 1

| ODSO Name | Formula | Structure Examples |
| --- | --- | --- |
| Dialkyl-sulfonesulfoxide Or 1,2-alkyl-alkyl-disulfane 1,1,2-trioxide | (R—SOO—SO—R') | 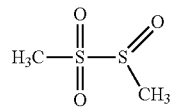<br>1,2-Dimethyl-disulfane 1,1,2-trioxide |
| Dialkyl-disulfone Or 1,2 alkyl-alkyl-disulfane 1,1,2,2-tetraoxide | (R—SOO—SOO—R') | 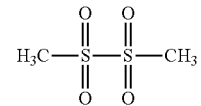<br>1,2-Dimethyldisulfane 1,1,2,2-tetraoxide |
| Alkyl-sulfoxidesulfonate | (R—SO—SOO—OH) | 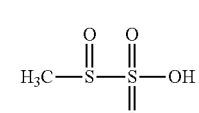<br>Methylsulfanesulfonic acid oxide |

TABLE 1-continued

| ODSO Name | Formula | Structure Examples |
|---|---|---|
| Alkyl-sulfonesulfonate | (R—SOO—SOO—OH) | $H_3C-\underset{\underset{O}{\|}}{\overset{\overset{O}{\|}}{S}}-\underset{\underset{O}{\|}}{\overset{\overset{O}{\|}}{S}}-OH$<br>1-Hydroxy-2-methyl-disulfane 1,1,2,2-tetraoxide |
| Alkyl-sulfoxidesulfinate | (R—SO—SO—OH) | $H_3C-\overset{\overset{O}{\|}}{S}-\overset{\overset{O}{\|}}{S}-OH$<br>1-Hydroxy-2-methyl-disulfane 1,2-dioxide |
| Alkyl-sulfonesulfinate | (R—SOO—SO—OH) | $H_3C-\underset{\underset{O}{\|}}{\overset{\overset{O}{\|}}{S}}-\overset{\overset{O}{\|}}{S}-OH$<br>Methylsulfanesulfinic acid dioxide |

R and R' can be the same or different C1-C10 alkyl or C6-C10 aryl.

What is claimed is:

1. A method for synthesis of crystalline material comprising:
   forming a sol-gel composition of precursors, reagents, water and water-soluble oxidized disulfide oil (ODSO) effective for the crystalline material; and
   heating the sol-gel composition under conditions and for a time effective to form a precipitate suspended in a supernatant, wherein the precipitate comprises a crystalline material, and wherein
   the crystalline material is characterized by a relative crystallinity that is greater than that of a comparative material, and/or crystalline material is formed at a crystallization rate that is greater than that of a comparative material, and wherein the comparative material is formed of approximately equivalent composition of components except for water instead of the added ODSO, and under approximately equivalent conditions and time.

2. The method of claim 1, wherein the crystalline material is zeolite and precursors and reagents effective for the crystalline material comprise a silica source, an optional alumina source, a mineralizer, an optional structure directing agent an optional seed material,
   wherein the zeolite is one or more of zeolites identified by the International Zeolite Association, including those with the identifiers ABW, ACO, AEI, AEL, AEN, AET, AFG, AFI, AFN, AFO, AFR, AFS, AFT, AFV, AFX, AFY, AHT, ANA, ANO, APC, APD, AST, ASV, ATN, ATO, ATS, ATT, ATV, AVE, AVL, AWO, AWW, BCT, BEC, BIK, BOF, BOG, BOZ, BPH, BRE, BSV, CAN, CAS, CDO, CFI, CGF, CGS, CHA, —CHI, -CLO, CON, CSV, CZP, DAC, DDR, DFO, DFT, DOH, DON, EAB, EDI, EEI, EMT, EON, EPI, ERI, ESV, ETL, ETR, ETV, EUO, EWO, EWS, EZT, FAR, FAU, FER, FRA, GIS, GIU, GME, GON, GOO, HEU, IFO, IFR, -IFT, —IFU, IFW, IFY, IHW, IMF, IRN, IRR, —IRY, ISV, ITE, ITG, ITH, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, MRT, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POR, POS, PSI, PTO, PTT, PTY, PUN, PWN, PWO, PWW, RHO, —RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, SFW, SGT, SIV, SOD, SOF, SOR, SOS, SOV, SSF, SSY, STF, STI, STT, STW, —SVR, SVV, SWY, -SYT, SZR, TER, THO, TOL, TON, TSC, TUN, UEI, UFI, UOS, UOV, UOZ, USI, UTL, UWY, VET, VFI, VNI, VSV, WEI, -WEN, YFI, YUG, ZON, *BEA, *CTH, *-EWT, *-ITN, *MRE, *PCS, *SFV, *—SSO, *STO, *—SVY, or *UOE, or one or more zeolites synthesized comprising co-crystallized products of two or more types of zeolites identified above, or a zeolite comprising siliceous crystalline materials with a SAR close to infinity,
   wherein the zeolite possesses MFI, FAU, *BEA, MOR, or CHA frameworks,
   wherein the structure directing agent is one or more of quaternary ammonium ions, trialkylamines, dialkylamines, monoalkylamines, cyclic amines, alkylethanol amines, cyclic diamines, alkyl diamines, alkyl polyamines, and other templates including alcohols, ketones, morpholine and glycerol.

3. The method of claim 2, wherein the mineralizer comprises is sodium and wherein
   the zeolite is a ZSM-5 zeolite and the mass ratio of ODSO to sodium from the mineralizer is in the range of about 0.1-10 and the amount by mass of water in the sol-gel composition can be substituted with ODSO in an amount of up to about 15%.

4. The method of claim 1, wherein the crystalline material is an AlPO and the precursors and reagents effective for the crystalline material comprise an alumina source, a phosphorus source, an acid medium, an optional structure directing agent and an optional seed material, wherein the AlPO is one or more of AlPO sub-types: (AEI) including AlPO-18, (AEL) including AlPO-11, (AEN) including AlPO-53, (AET) including AlPO-8, (AFI) including AlPO-5, (AFN) including AlPO-14, (AFO) including AlPO-41, (AFR) including AlPO-40; (AFT) including AlPO-52; (ANA) including AlPO-24; (AST) including AlPO-16; (ATO) including AlPO-31; (ATS) including AlPO-36; (ATT) including AlPO-33; (ATV) including AlPO-25; (AWO) including AlPO-21; (AWW) including AlPO-22; (CHA) including AlPO-34; (ERI) including AlPO-17; (LEV) including AlPO-35; (SOD) including AlPO-20; or (VFI) including AlPO-54, wherein the structure directing agent is one or more of secondary and tertiary amine derived templates, quaternary ammonium derived templates, azamacrocycle derived templates, spiro templates, diaazabicyclo derived templates, or phosphazine based templates.

5. The method of claim 1, wherein the crystalline material is a SAPO and the precursors and reagents effective for the crystalline material comprise an alumina source, a silica source, a phosphorus source, an acid medium, an optional structure directing agent and an optional seed material, which are formed as a homogeneous aqueous solution, wherein the SAPO is one or more of SAPO sub-types: (AEI) including SAPO-18, (AEL) including SAPO-11, (AFI) including SAPO-5, (AFO) including SAPO-41, (AFR) including SAPO-40, (AFX) including SAPO-56, (ATN) including SAPO-39, (ATO) including SAPO-31, (CHA) including SAPO-34 and -47, (FAU) including SAPO-37, (GIS) including SAPO-43, (LEV) including SAPO-35, or (LTA) including SAPO-42, wherein the structure directing agent is one or more of secondary and tertiary amine derived templates, quaternary ammonium derived templates, azamacrocycle derived templates, spiro templates, diaazabicyclo derived templates, or phosphazine based templates.

6. The method of claim 1, wherein the crystalline material is a MAPO and the precursors and reagents effective for the crystalline material comprise an alumina source, a metal source, a phosphorus source, an acid medium, an optional structure directing agent and an optional seed material, which are formed as a homogeneous aqueous solution, wherein the MAPO is one or more of MAPO sub-types: (AFI) including MAPO-5; (AFS) including MAPO-46; (ATN) including MAPO-39; (ATO) including MAPO-31; (ATS) including MAPO-36; or (GIS) including MAPO-43, wherein the structure directing agent is one or more of secondary and tertiary amine derived templates, quaternary ammonium derived templates, azamacrocycle derived templates, spiro templates, diaazabicyclo derived templates, or phosphazine based templates, wherein the metal source is one or more of Ti, V, Cr, Mn, Fe, Co, Ni, Cu, Zn, Cd or Mg.

7. The method of claim 6, wherein the metal source is one or more of Ti, V, Cr, Mn, Fe, Co, Ni, Cu, Zn, Cd or Mg.

8. The method of claim 1, wherein the precipitate further comprises amorphous material.

9. The method of claim 8, wherein the amount of crystalline material (C) relative to the amount of amorphous material (A) in the precipitate is calculated by the following equations:

$$R_p = 100 \times \frac{S_p(ZMV)_p}{\sum_i S_i(ZMV)_i},$$

$$\text{Corr}(R_p) = R_p \times \frac{W_{Std}}{R_{Std}},$$

$$A = 100 - W_{Std} - \sum \text{Corr}(R_p),$$

and $$C = 100 - A,$$

wherein:
- $R_p$=relative proportion of a particular phase,
- S=the Rietveld scale factor, which is a parameter that is sample and phase dependent,
- Z=the number of formula units per unit cell,
- M=the mass of the formula unit,
- V=the unit-cell volume,
- i=number of phases in sample,
- p=a particular phase,
- Corr(Rp)=corrected relative proportion of a particular phase,
- $W_{Std}(\%)$=the weighed concentration of an internal standard, and
- $R_{Std}(\%)$=the Rietveld analyzed concentration of the internal standard.

10. The method of claim 1, wherein the sol-gel composition can be from a colloidal suspension in appearance to a dense gel or paste.

11. The method of claim 1, that has an operating pressure in the range of from atmospheric pressure to 17 bar.

12. The method of claim 1, that has an operating pressure of autogenous pressure.

13. The method of claim 1, further comprising introducing a nitrogen blanket or purge air prior to heating.

14. The method of claim 1, wherein the ODSO is derived from oxidation of disulfide oil compounds present in an effluent refinery hydrocarbon stream recovered following catalytic oxidation of mercaptans present in a mercaptan-containing hydrocarbon stream.

15. The method of claim 1, wherein the one or more ODSO compounds comprise ODSO compounds having 3 or more oxygen atoms and 1 to 20 carbon atoms, and are contained in a mixture having an average density greater than about 1.0 g/cc and an average boiling point greater than about 80°.

16. The method of claim 1, wherein the ODSO compounds have 3 or more oxygen atoms and include:
one or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), two or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR);

one or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH); or two or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH);

wherein R and R' are C1-C10 alkyl or C6-C10 aryl groups.

17. A method for synthesis of crystalline material comprising:
forming a sol-gel composition of precursors, reagents, water and water-soluble oxidized disulfide oil (ODSO) effective for the crystalline material; and
heating the sol-gel composition under conditions and for a time effective to form a precipitate suspended in a supernatant, wherein the precipitate comprises a crystalline material, wherein the crystalline material is characterized by a relative crystallinity that is greater than that of a comparative material, and wherein the comparative material is formed of approximately equivalent composition of components except for water instead of the added ODSO, and under approximately equivalent conditions and time.

18. The method of claim 17, wherein the relative crystallinity of the crystalline material is in the range of from 1-85% greater than that of an equivalent water-only crystalline material synthesis.

19. A method for synthesis of crystalline material comprising:
forming a sol-gel composition of precursors, reagents, water and water-soluble oxidized disulfide oil (ODSO) effective for the crystalline material; and
heating the sol-gel composition mixture under conditions and for a time effective to form precipitate suspended in a supernatant, wherein the precipitate comprises a crystalline material, wherein the crystalline material is formed at a crystallization rate that is greater than that of a comparative material, and wherein the comparative material is formed of approximately equivalent composition of components except for water instead of the added ODSO, and under approximately equivalent conditions and time.

20. The method as in claim 19, wherein the crystalline material is formed at a crystallization rate that is in the range of from 1-90% greater than that of an equivalent water-only crystalline material synthesis.

* * * * *